(12) United States Patent
Ishikawa et al.

(10) Patent No.: US 9,805,598 B2
(45) Date of Patent: Oct. 31, 2017

(54) MANAGEMENT OF MOBILE OBJECTS

(71) Applicant: International Business Machines Corporation, Armonk, NY (US)

(72) Inventors: Hiromi Ishikawa, Tokyo (JP); Atsushi Tsuchiya, Tokyo (JP); Gaku Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/970,643

(22) Filed: Dec. 16, 2015

(65) Prior Publication Data

US 2017/0178505 A1 Jun. 22, 2017

(51) Int. Cl.
G08G 1/09 (2006.01)
H04B 1/3822 (2015.01)
H04L 29/08 (2006.01)
G01C 21/36 (2006.01)

(52) U.S. Cl.
CPC ........... *G08G 1/09* (2013.01); *G01C 21/3658* (2013.01); *H04B 1/3822* (2013.01); *H04L 67/10* (2013.01)

(58) Field of Classification Search
CPC ................................................ G01C 21/3658
See application file for complete search history.

(56) References Cited

U.S. PATENT DOCUMENTS

| | | | |
|---|---|---|---|
| 5,504,482 A | 4/1996 | Schreder | |
| 6,028,550 A | 2/2000 | Froeberg et al. | |
| 6,150,961 A | 11/2000 | Alewine et al. | |
| 7,395,151 B2 | 7/2008 | O'Neill et al. | |
| 7,447,588 B1 | 11/2008 | Xu et al. | |
| 7,689,348 B2 | 3/2010 | Boss et al. | |
| 7,710,421 B2 | 5/2010 | Muramatsu | |
| 7,899,611 B2 | 3/2011 | Downs et al. | |
| 7,979,172 B2 | 7/2011 | Breed | |
| 8,000,887 B2 | 8/2011 | Nathan et al. | |
| 8,396,652 B2 | 3/2013 | Nomura | |
| 8,428,876 B2 | 4/2013 | Lee | |
| 8,620,510 B1 | 12/2013 | Meuth et al. | |

(Continued)

FOREIGN PATENT DOCUMENTS

CN 102147260 A 8/2011
CN 102231231 A 11/2011

(Continued)

OTHER PUBLICATIONS

IBM, "List of IBM Patents or Patent Applications Treated as Related (Appendix P)," Mar. 28, 2016, p. 1-3.

(Continued)

*Primary Examiner* — Jonathan M Dager
(74) *Attorney, Agent, or Firm* — Erik K. Johnson

(57) ABSTRACT

To avoid congestion and ease traffic jams of mobile objects while managing movement of a plurality of mobile objects in a geographic space, provided is a system including a mobile object server operable to assist with movement of a plurality of mobile objects in a geographic space; and a priority control module operable to perform priority movement control that causes a mobile object having high priority to be prioritized over and progress ahead of a mobile object having low priority, based on priorities assigned to each of a plurality of mobile objects. Also provided are a method and program.

11 Claims, 25 Drawing Sheets

(56) References Cited

U.S. PATENT DOCUMENTS

| | | | |
|---|---|---|---|
| 8,768,012 B2 | 7/2014 | Satoh | |
| 8,788,134 B1* | 7/2014 | Litkouhi | B62D 15/0255 |
| | | | 701/23 |
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,909,462 B2* | 12/2014 | Lection | G08G 1/081 |
| | | | 340/909 |
| 8,930,269 B2 | 1/2015 | He et al. | |
| 8,988,252 B2 | 3/2015 | Scholl et al. | |
| 9,079,587 B1 | 7/2015 | Rupp et al. | |
| 9,120,484 B1 | 9/2015 | Ferguson et al. | |
| 9,269,262 B2* | 2/2016 | Lee | G08G 1/07 |
| 9,340,207 B2* | 5/2016 | Nagasaka | B60W 30/10 |
| 9,383,215 B2* | 7/2016 | Yamashiro | G01C 21/3407 |
| 9,384,661 B1* | 7/2016 | DeLuca | G08G 1/096838 |
| 9,412,271 B2* | 8/2016 | Sharma | G08G 1/052 |
| 9,483,939 B2* | 11/2016 | Modica | G08G 1/07 |
| 9,523,984 B1* | 12/2016 | Herbach | B62D 15/025 |
| 2005/0065711 A1 | 3/2005 | Dahlgren et al. | |
| 2005/0187701 A1* | 8/2005 | Baney | G08G 1/096716 |
| | | | 701/117 |
| 2007/0109303 A1 | 5/2007 | Muramatsu | |
| 2007/0241932 A1 | 10/2007 | Otero et al. | |
| 2007/0299595 A1* | 12/2007 | Boldin | G08G 1/0104 |
| | | | 701/117 |
| 2008/0046134 A1 | 2/2008 | Bruce et al. | |
| 2008/0172171 A1* | 7/2008 | Kowalski | G08G 1/065 |
| | | | 701/118 |
| 2009/0018761 A1* | 1/2009 | Petrisor | G08G 1/017 |
| | | | 701/118 |
| 2009/0070024 A1 | 3/2009 | Burchard et al. | |
| 2009/0219393 A1 | 9/2009 | Vian et al. | |
| 2009/0248758 A1 | 10/2009 | Sawai et al. | |
| 2009/0287405 A1 | 11/2009 | Liu et al. | |
| 2009/0327918 A1 | 12/2009 | Aaron et al. | |
| 2010/0036595 A1 | 2/2010 | Coy et al. | |
| 2010/0134320 A1* | 6/2010 | Chevion | G08G 1/164 |
| | | | 340/932 |
| 2010/0188265 A1 | 7/2010 | Hill et al. | |
| 2010/0199213 A1 | 8/2010 | Suzuki | |
| 2011/0037619 A1 | 2/2011 | Ginsberg et al. | |
| 2011/0205040 A1 | 8/2011 | Van Wiemeersch et al. | |
| 2011/0205086 A1* | 8/2011 | Lamprecht | G08G 1/08 |
| | | | 340/928 |
| 2011/0276692 A1 | 11/2011 | Waldman et al. | |
| 2012/0083960 A1* | 4/2012 | Zhu | G05D 1/0055 |
| | | | 701/23 |
| 2012/0092187 A1 | 4/2012 | Scholl et al. | |
| 2012/0123677 A1 | 5/2012 | Shimotani et al. | |
| 2012/0291049 A1 | 11/2012 | Park et al. | |
| 2013/0006925 A1 | 1/2013 | Sawai et al. | |
| 2013/0013179 A1* | 1/2013 | Lection | G08G 1/0145 |
| | | | 701/117 |
| 2013/0099942 A1* | 4/2013 | Mantalvanos | G08G 1/082 |
| | | | 340/910 |
| 2013/0204524 A1 | 8/2013 | Fryer et al. | |
| 2013/0214939 A1 | 8/2013 | Washlow et al. | |
| 2013/0321397 A1 | 12/2013 | Chen et al. | |
| 2013/0338868 A1* | 12/2013 | Essame | B60W 30/18163 |
| | | | 701/23 |
| 2014/0120953 A1 | 5/2014 | Ingram et al. | |
| 2014/0136099 A1 | 5/2014 | Choi et al. | |
| 2014/0191858 A1 | 7/2014 | Morgan et al. | |
| 2014/0195102 A1* | 7/2014 | Nathanson | G07C 5/0808 |
| | | | 701/31.4 |
| 2014/0195214 A1 | 7/2014 | Kozloski et al. | |
| 2014/0236414 A1 | 8/2014 | Droz et al. | |
| 2014/0248899 A1 | 9/2014 | Emadzadeh et al. | |
| 2014/0278026 A1 | 9/2014 | Taylor | |
| 2014/0278029 A1 | 9/2014 | Tonguz et al. | |
| 2014/0278052 A1* | 9/2014 | Slavin | G01C 21/3492 |
| | | | 701/400 |
| 2014/0289267 A1 | 9/2014 | Felix et al. | |
| 2015/0051822 A1 | 2/2015 | Joglekar | |
| 2015/0066284 A1 | 3/2015 | Yopp | |
| 2015/0066340 A1* | 3/2015 | Nelson | G08G 1/095 |
| | | | 701/117 |
| 2015/0120083 A1 | 4/2015 | Gurovich et al. | |
| 2015/0149019 A1 | 5/2015 | Pilutti et al. | |
| 2015/0179077 A1 | 6/2015 | Morgan et al. | |
| 2015/0260531 A1* | 9/2015 | Ehsani | G01C 21/3484 |
| | | | 701/538 |
| 2015/0344038 A1 | 12/2015 | Stenneth et al. | |
| 2015/0346718 A1* | 12/2015 | Stenneth | G06Q 30/0611 |
| | | | 701/2 |
| 2016/0075332 A1 | 3/2016 | Edo-Ros | |
| 2016/0176397 A1* | 6/2016 | Prokhorov | B60W 30/09 |
| | | | 701/25 |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |

OTHER PUBLICATIONS

Gotoh et al., "Geographic Space Management," Application and Drawings, filed Jun. 19, 2015, p. 1-97, U.S. Appl. No. 14/744,052.

Gotoh et al., "Geographic Space Management," Application and Drawings, filed Jun. 25, 2015, p. 1-95, U.S. Appl. No. 14/750,298.

Gotoh et al., "Geographic Space Management," Application and Drawings, Filed on Jun. 25, 2015, p. 1-95, U.S. Appl. No. 14/750,334.

Gotoh et al., "Geographic Space Management," Application and Drawings, filed Jul. 8, 2015, p. 1-93, U.S. Appl. No. 14/793,934.

Gotoh et al., "Geographic Space Management," Application and Drawings, filed Jun. 19, 2015, p. 1-95, U.S. Appl. No. 14/744,056.

Gotoh et al., "Geographic Space Management," Application and Drawings, filed Jul. 16, 2015, p. 1-92, U.S. Appl. No. 14/800,774.

Gotoh et al., "Geographic Space Management," Application and Drawings, filed Jul. 16, 2015, p. 1-92, U.S. Appl. No. 14/800,782.

Gotoh et al., "Geographic Space Management," Application and Drawings, filed Jun. 19, 2015, p. 1-94, U.S. Appl. No. 14/744,066.

Gotoh et al., "Geographic Space Management," Application and Drawings, filed Jul. 16, 2015, p. 1-91, U.S. Appl. No. 14/800,795.

Gotoh et al., "Geographic Space Management," Application and Drawings, filed Jul. 16, 2015, p. 1-91, U.S. Appl. No. 14/800,811.

(56) References Cited

OTHER PUBLICATIONS

Gotoh et al., "Geographic Space Management," Application and Drawings, filed Jun. 19, 2015, p. 1-93, U.S. Appl. No. 14/744,067.
Gotoh et al., "Geographic Space Management," Application and Drawings, filed Jul. 16, 2015, p. 1-93, U.S. Appl. No. 14/800,821.
Gotoh et al., "Geographic Space Management," Application and Drawings, filed Jul. 16, 2015, p. 1-91, U.S. Appl. No. 14/800,839.
Gotoh et al., "Management of Moving Objects," Application and Drawings, filed Jun. 19, 2015, p. 1-46, U.S. Appl. No. 14/744,071.
Gotoh et al., "Management of Moving Objects," Application and Drawings, filed Jul. 17, 2015, p. 1-46, U.S. Appl. No. 14/802,289.
Gotoh et al., "Management of Moving Objects," Application and Drawings, filed Jul. 17, 2015, p. 1-46, U.S. Appl. No. 14/802,316.
Yamamoto, "Management of Moving Objects," Application and Drawings, filed Jun. 19, 2015, p. 1-59, U.S. Appl. No. 14/744,074.
Yamamoto, "Management of Moving Objects," Application and Drawings, filed Jul. 17, 2015, p. 1-58, U.S. Appl. No. 14/802,343.
Yamamoto, "Management of Moving Objects," Application and Drawings, filed Jul. 17, 2015, p. 1-58, U.S. Appl. No. 14/802,361.
Gotoh et al., "Management of Events and Moving Objects," Application and Drawings, filed Jul. 7, 2015, p. 1-69, U.S. Appl. No. 14/792,805.
Gotoh et al., "Management of Events and Moving Objects," Application and Drawings, filed Jul. 16, 2015, p. 1-68, U.S. Appl. No. 14/801,014.
Gotoh et al., "Management of Events and Moving Objects," Application and Drawings, filed Jul. 16, 2015, p. 1-68, U.S. Appl. No. 14/801,054.
Miyahira et al., "Management of Mobile Objects and Service Platform for Mobile Objects," Application and Drawings, filed Dec. 16, 2015, p. 1-69, U.S. Appl. No. 14/970,596.
Nishimura et al., "Management of Dynamic Events and Moving Objects," Application and Drawings, filed Dec. 16, 2015, p. 1-92, U.S. Appl. Serial No. 14/970,600.
Ishikawa et al., "Management of Evacuation With Mobile Objects," Application and Drawings, filed Dec. 16, 2015, p. 1-50, U.S. Appl. No. 14/970,609.
Gotoh et al., "Geographic Space Management," Application and Drawings, filed Dec. 16, 2015, p. 1-72, U.S. Appl. No. 14/970,616.
Ishikawa et al., "Management of Mobile Objects and Resources," Application and Drawings, filed Dec. 16, 2015, p. 1-52, U.S. Appl. No. 14/970,626.
Gotoh et al., "Management of Mobile Objects," Application and Drawings, filed Dec. 16, 2015, p. 1-65, U.S. Appl. No. 14/970,631.
Ishikawa et al., "Management of Mobile Objects," Application and Drawings, filed Dec. 16, 2015, p. 1-78, U.S. Appl. No. 14/970,643.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Dangel et al., "Can Road Traffic Volume Information Improve Partitioning for Distributed SUMO?," Modeling Mobility with Open Data, Lecture Notes in Mobiity, 2015, p. 61-74, Springer International Pubishing.
DRM, "Local Dynamic Map," DRM Research Seminar, Jun. 30, 2010, p. 1-72, Japan Digital Road Map Association.
Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
Ihm et al., "Advanced Spatial Data Management for Enterprise Applications," An Oracle White Paper, Aug. 2010, p. 1-16, Oracle Spatial 11g.
Openstreetmap, "QuadTiles," OpenStreetMap Wiki, Last Modified on Mar. 3, 2014, p. 1-10, http://wiki.openstreetmap.org/wiki/QuadTiles,Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Schade, "Sharing Data by Means of a Local Dynamic Map," Understanding the Standards for Cooperative ITS, Feb. 6, 2014, p. 1-10, MINES ParisTech, Transportation Sustainabiity Environment Consulting.
Suzumura et al., "X10-based Massive Parallel Large-Scale Traffic Flow Simulation," ProVISION, Winter 2012, p. 74-79, No. 72, IBM Professionals' Papers.
Y et al., "A Complex Event Processing System Approach to Real Time Road Traffic Event Detection," Journal of Convergence Information Technology (JCIT), Oct. 2013, p. 142-148, vol. 8, No. 15.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.

* cited by examiner

Event List

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ▪▪▪▪▪▪ | ▪▪▪▪▪▪ | ▪▪▪▪▪▪ | ▪▪▪▪▪▪ | ▪▪▪▪▪▪ |
| Edge 1000 | N/A | - | - | Eve 1201 (edge xxxx) |

FIG.9

Candidate Event List

| Edge ID | Counts | Location | Event Content |
|---|---|---|---|
| Edge 0009 | 2 | Full length | Congestion |
| Edge 0013 | 1 | 15m from the 2nd node | Skid |
| ▪▪▪▪▪▪ | ▪▪▪▪▪▪ | ▪▪▪▪▪▪ | |

*FIG. 10*

Notification Event List

| Edge ID | Event ID | Location | Event Content |
|---|---|---|---|
| Edge 0001 | Eve 0214 | Full Length | Speed Limited to 30km/h |
| Edge 0002 | Eve 0114 | 32m from the 1st node | Closure |

*FIG.11*

MANAGEMENT OF MOBILE OBJECTS

BACKGROUND

The present invention relates to a system for managing geographic space and mobile objects thereon.

A high-speed driving support and automobile system is known that receives information from a plurality of automobiles, acquires information concerning accidents or obstructions on the road and maps this information onto a map along with the position of an automobile, and references automobile position information, automobile characteristic information, and driver characteristic information to transmit suitable event information to each automobile.

However, such a system has a problem that as the geographical region being handled expands, the number of automobiles and the number of roads increases, thereby increasing the amount of data being sent and received to a level that surpasses the processing capability of the server. Furthermore, there is known technology of using such a system for predicting a detour route or the like and transmitting this route information to each automobile in order for the automobiles to avoid traffic jams and congestion. However, in a case where there are few possible roads that can be used as detours or the amount of automobiles within the area where a traffic jam is predicted is particularly high, it is difficult to predict the detour route, and even when a detour route is predicted, many cars can gather in this detour route and cause a new traffic jam.

SUMMARY

According to a first aspect of the present invention, provided is a system comprising a mobile object server operable to assist with movement of a plurality of mobile objects in a geographic space; and a priority control module operable to perform priority movement control that causes a mobile object having high priority to be prioritized over and progress ahead of a mobile object having low priority, based on priorities assigned to each of a plurality of mobile objects. Also provided are a method and program.

BRIEF DESCRIPTION OF THE SEVERAL VIEWS OF THE DRAWINGS

FIG. 9 shows an illustrative example of an event list.

FIG. 10 shows an illustrative example of a candidate event list.

FIG. 11 shows an illustrative example of a notification event list.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
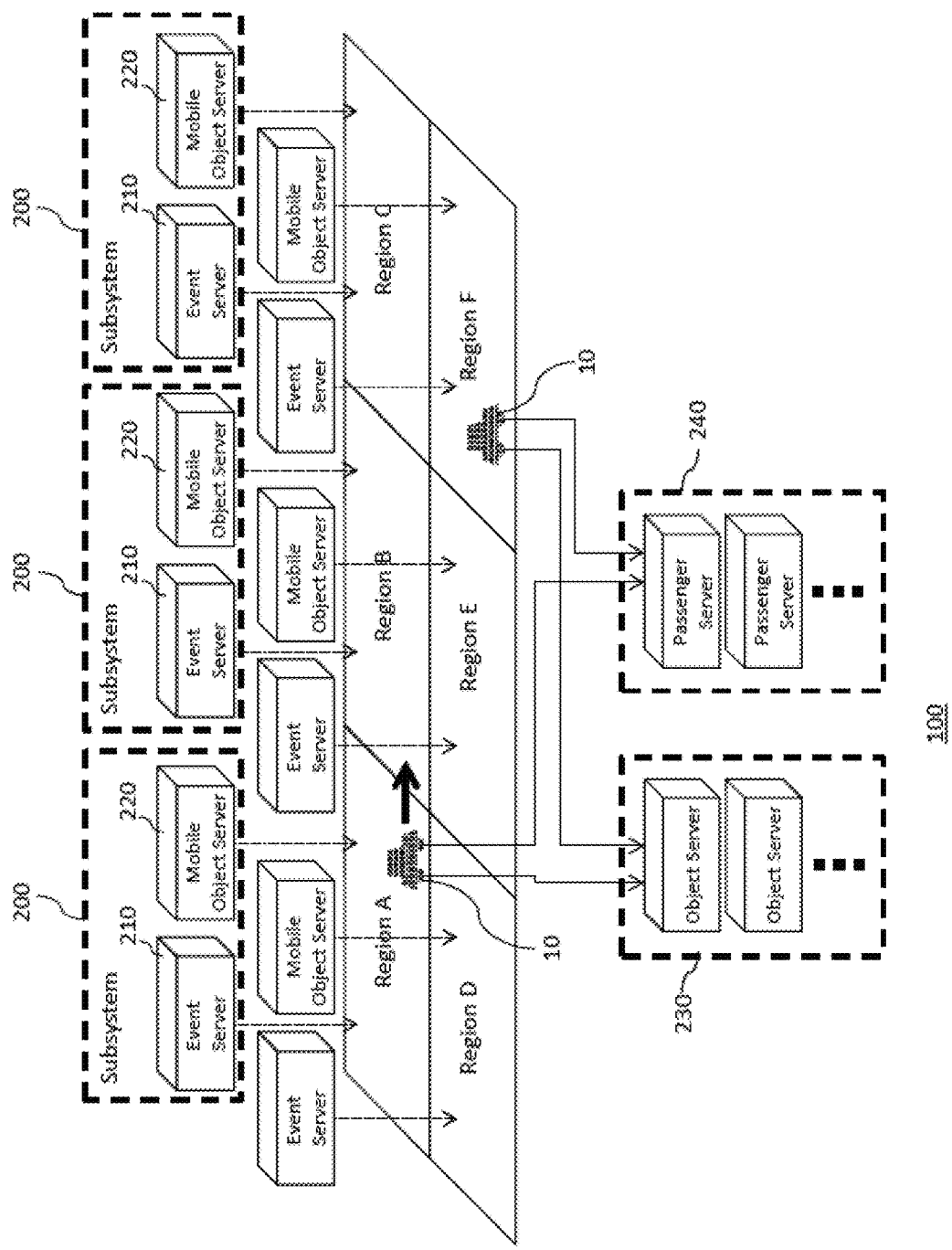
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In one embodiment, the mobile object server 220 assigned to region A may manages mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B on the regions. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
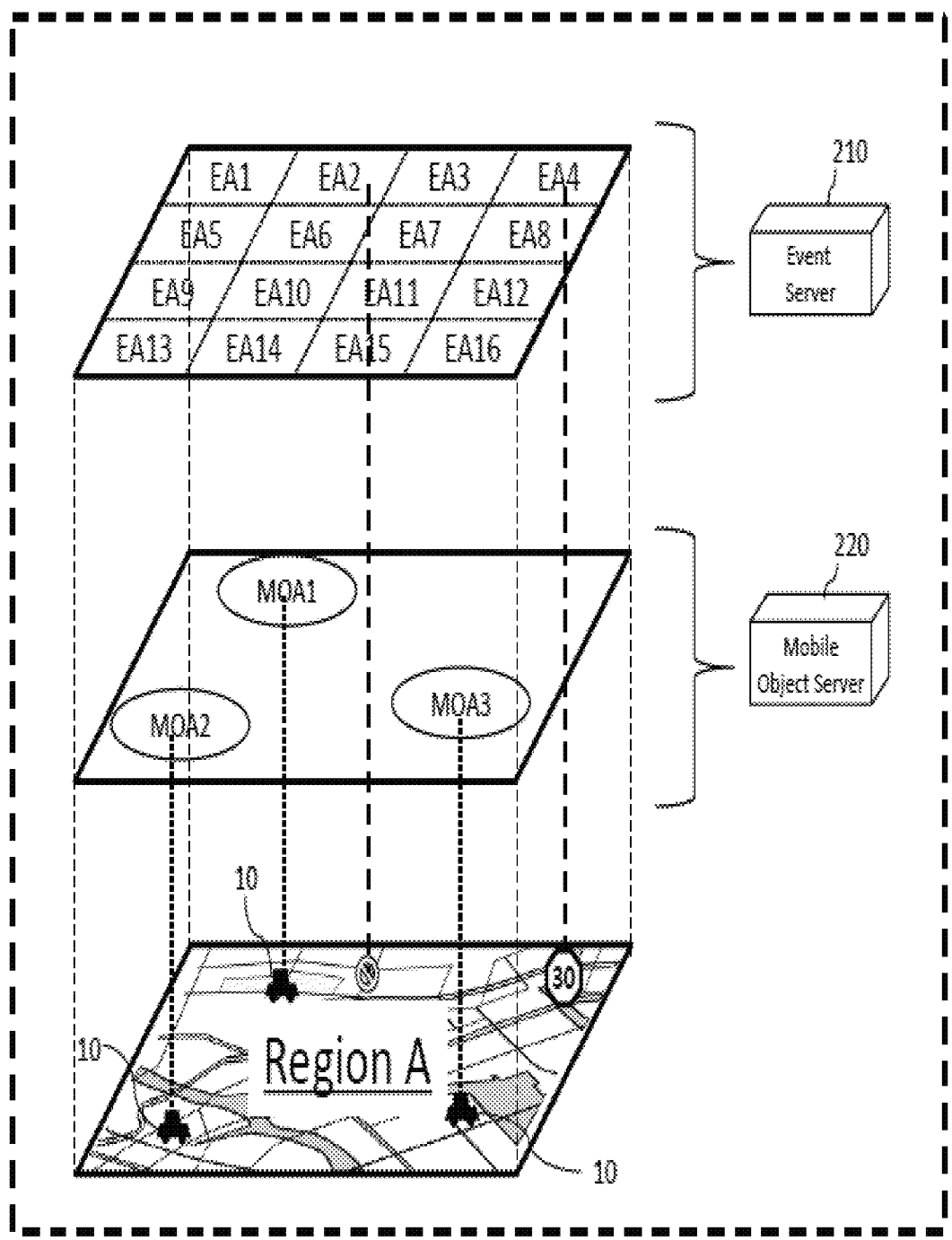
FIG. 2 shows a subsystem 200 according to the embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16 The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to each of the mobile objects 10. In the embodiment of FIG. 2, the mobile object server 220 includes three mobile object agents MOAs 1 -3 assigned to three mobile objects 10 in the assigned region A. The mobile object server 220 executes each of the mobile object agents MOA1-MOA3 to manage the mobile objects 10 traveling on the region A.

Figure 3:
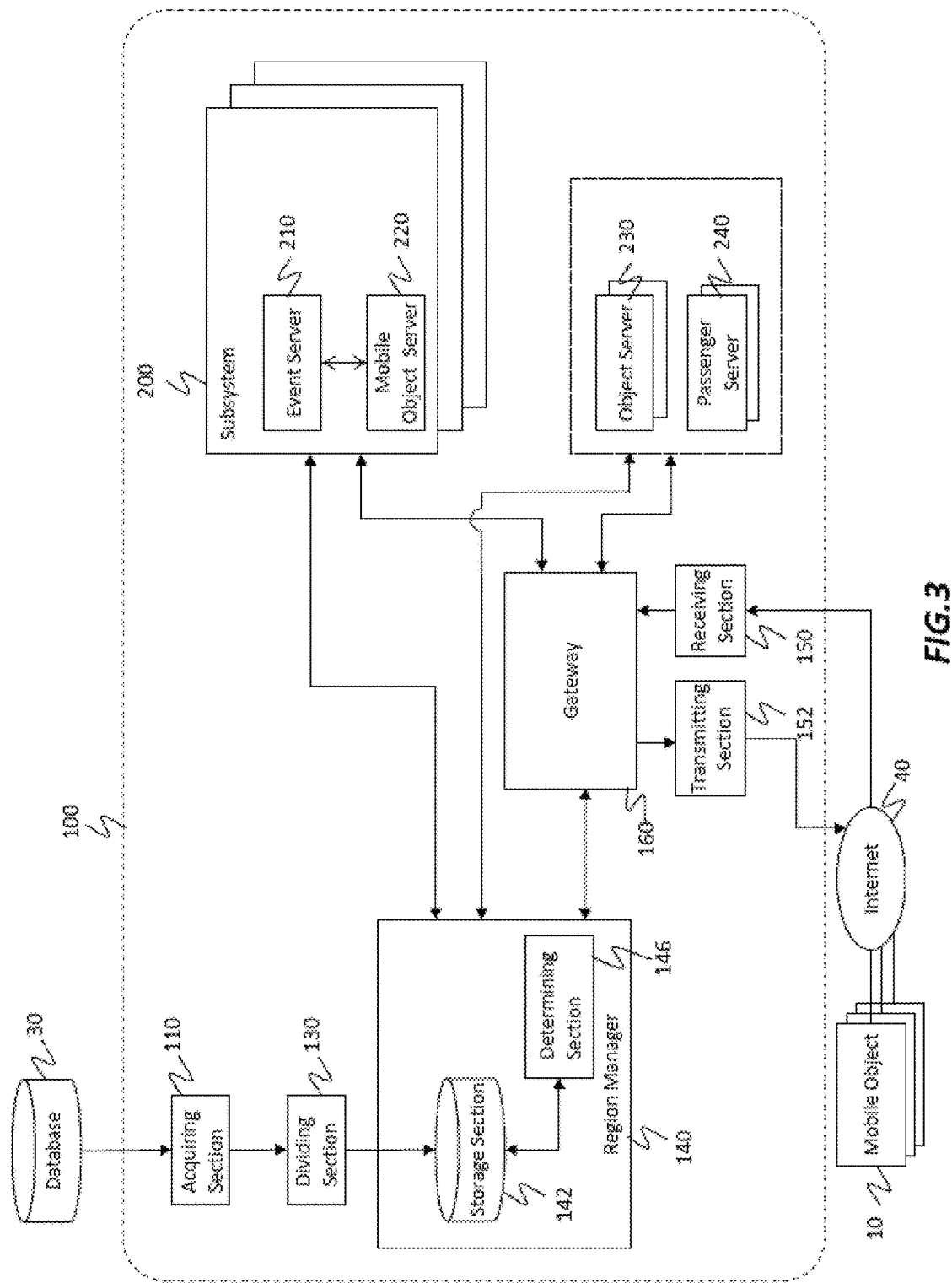
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes an acquiring section (i.e., module) 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a mobile object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire, accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the mobile object 10, in response to receiving the position of the mobile object 10. The region manager 140 may be implemented on one or more servers. The region manager 140 includes a storage section 142 and a determining section 146.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information to each of the mobile objects 10 according to settings, for example. The transmitting section 152 may transmit information concerning the route on which the mobile object 10 is expected to travel. The transmitting section 152 may communicate with the mobile objects 10 and transmit each type of information to the mobile objects 10 via the Internet 40. The transmitting section 152 may transmit each type of information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the mobile object 10 with information that assists the mobile object 10 with traveling in the geographic space.

A plurality of object servers 230 including at least one object server 230 may communicate with the gate way 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the mobile objects by utilizing the mobile object agents in each mobile object server 220, and manage the events by utilizing the event agent in each event server 210. According to the system 100 of the embodiment, the system 100 can separately manage information relating to the mobile objects 10 and events on the geographic map with a plurality of kinds of servers. Furthermore, the plurality of mobile object servers 220 can smoothly transfer the management of the mobile objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
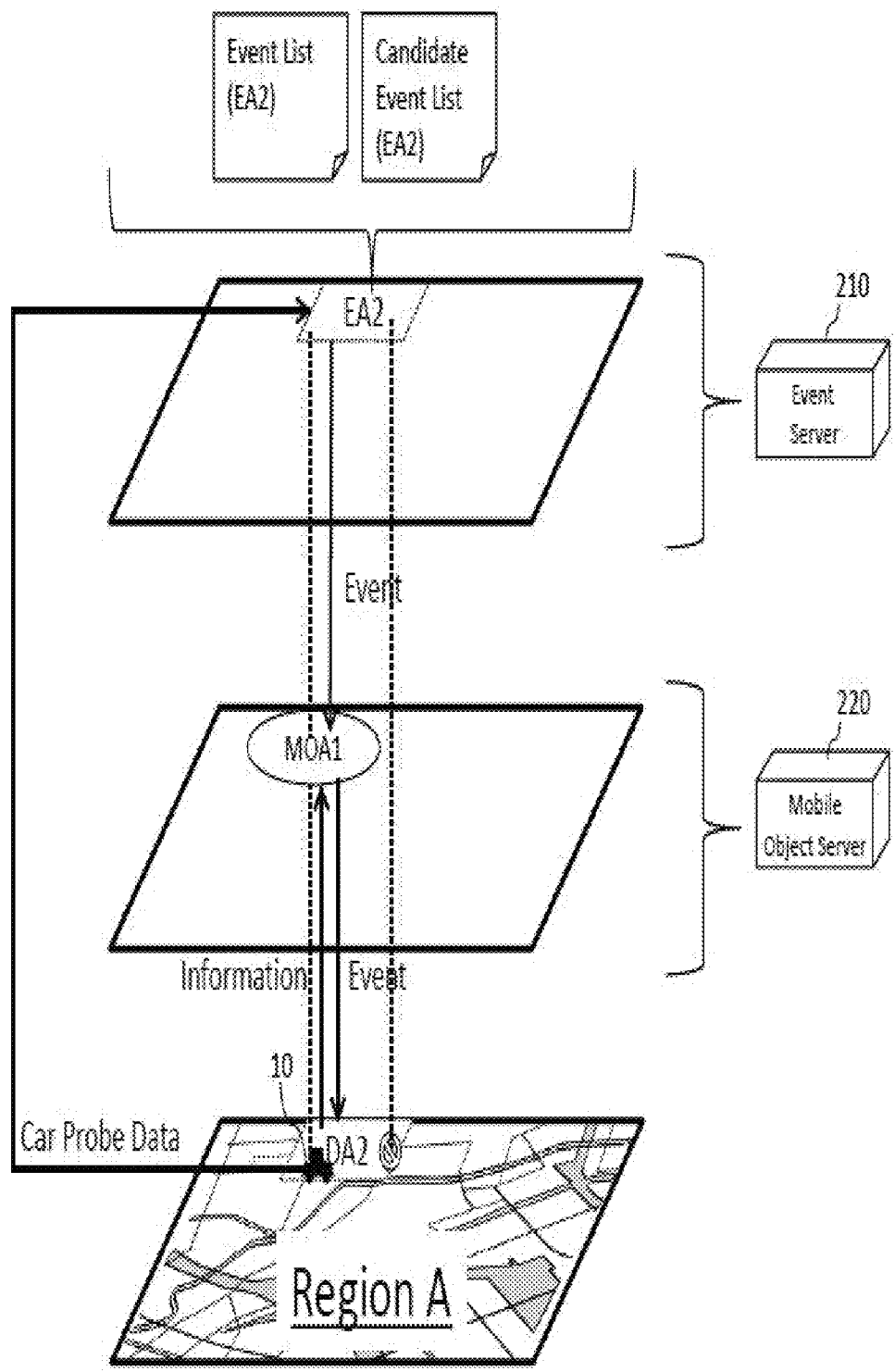
FIG. 4 shows management of events by the event server 210 and the mobile object server 220 according to one embodiment.

FIG. 4 shows management of events by the event server 210 and the mobile object server 220, according to an embodiment of the present invention. In this embodiment, a mobile object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

In one embodiment, each mobile object server 220 is operable to receive information from the mobile object 10 in the region A assigned to the mobile object server 220. The mobile object server 220 determines the target route where the mobile object 10 is located. The mobile object server 220 sends the information to one event server 210 assigned to a region A where the mobile object 10 is located, and thereby requests the event agent EA2 assigned to the area DA2 where the target route is located to send an event list containing information of an event on the target route and the influence event of the target route.

The mobile object server 220 executes the mobile object agent MOA1 or the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

Figure 5:
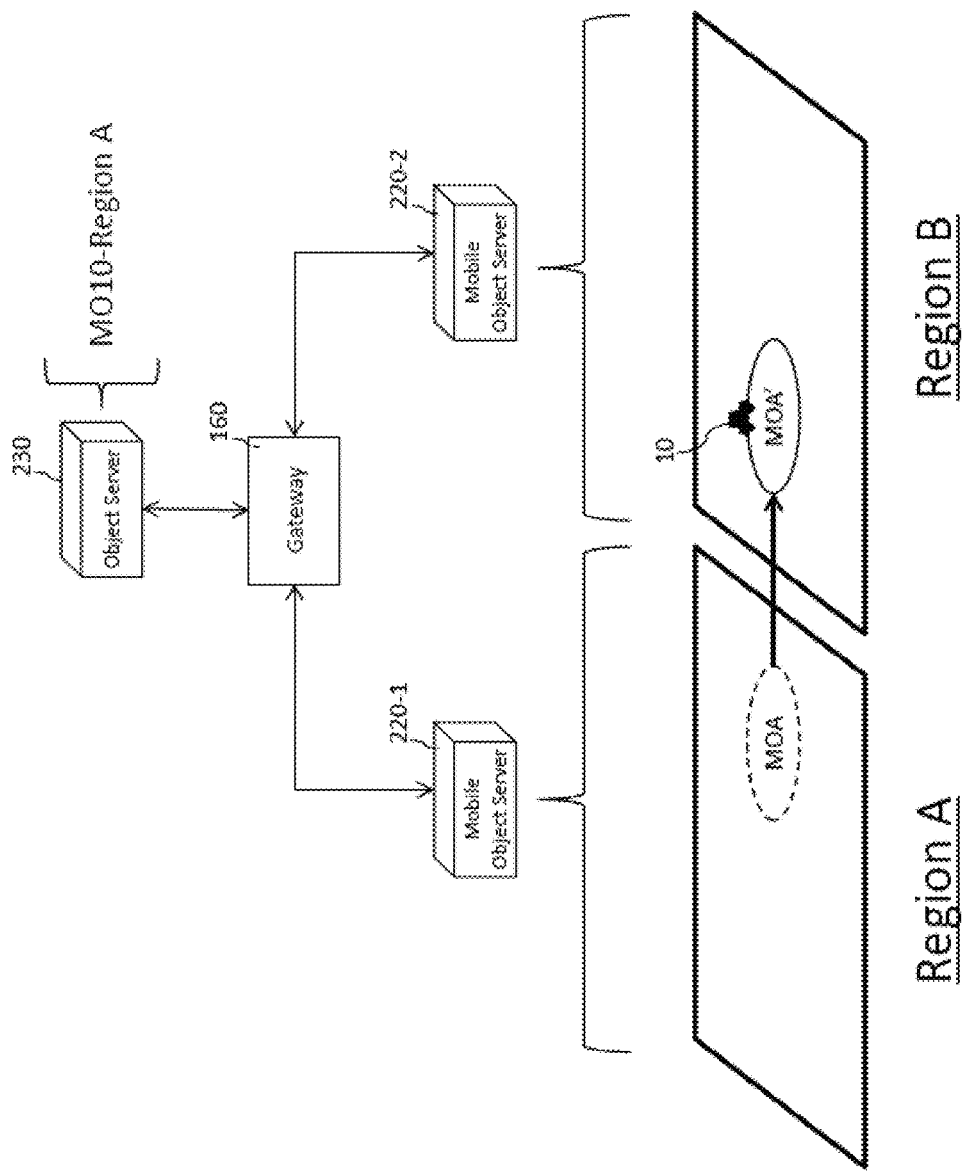
FIG. 5 shows management of mobile object by the mobile object server 220 and object server 230 according to one embodiment.

FIG. 5 shows management of a mobile object 10 by the mobile object servers 220 and object server 230, according to an embodiment of the present invention. The mobile object server 220-1 may transfer the mobile object agent to the mobile object server 220-2 assigned to a neighboring region in response to the mobile object 10 moving to the neighboring region. In this embodiment, in response to a mobile object 10 traveling from region A to region B, the mobile object server 220-1 managing region A deletes the mobile object agent MOA for the mobile object 10, and a mobile object server 220-2 managing region B generates a mobile object agent MOA for the mobile object 10.

In this embodiment, the object server 230 may store information that includes a mobile object server identifier MOS-ID that identifies one of the plurality of mobile object servers 220 executing the mobile object agent corresponding to the mobile object 10. Just after the mobile object 10 arrives at region B, the mobile object server 220-2 has not been executing the mobile object agent for the mobile object 10. The mobile object server 220-2 is operable to receive information from the mobile object 10 in the region B assigned to the mobile object server 220-2.

Using the information from the mobile object 10, the mobile object server 220-2 obtains the mobile object server identifier MOS-ID from the object server 230 that manages the object agent for the mobile object 10 because the mobile object server 220-2 is not executing the mobile object agent for the mobile object 10. The mobile object server 220-2 requests a mobile object server 220-1 identified by the mobile object server identifier MOS-ID to transfer the mobile object agent for the mobile object 10. Then the mobile object server 220-1 managing region A transfers the mobile object agent to the mobile object server 220-2 assigned to a neighboring region B in response to the request.

Figure 6:
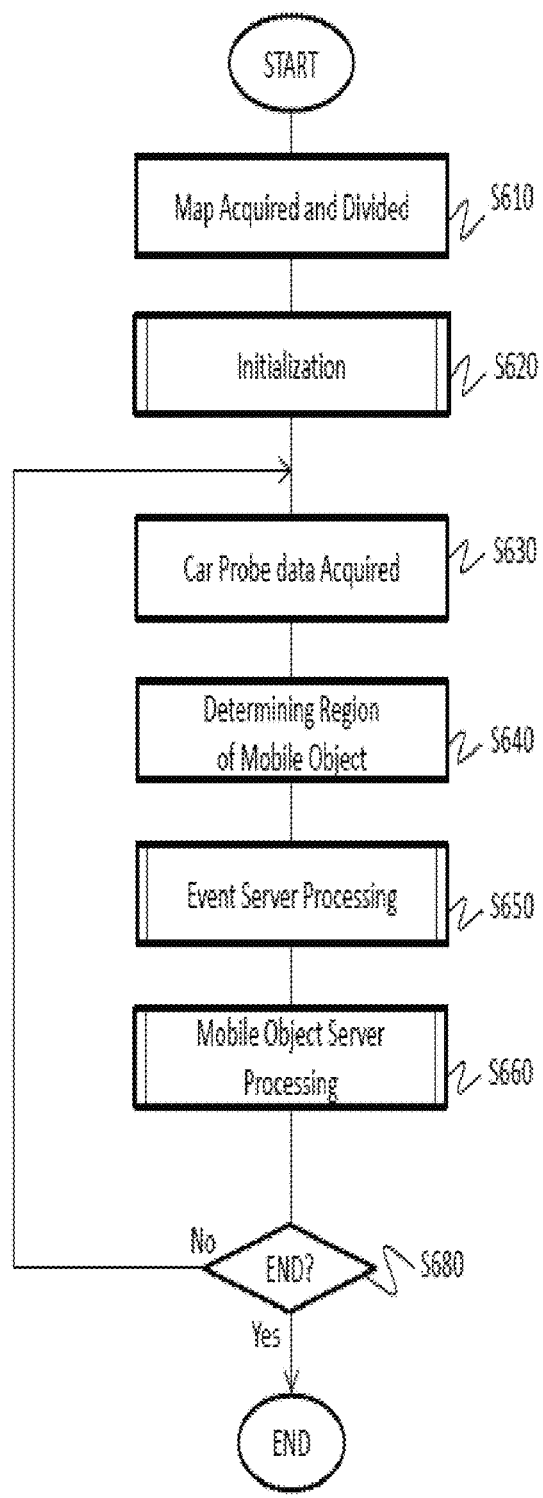
FIG. 6 shows an operational flow of an exemplary configuration of the system 100 according to the present embodiment.

FIG. 6 shows an operational flow of a system, according to an embodiment of the present invention. The present embodiment describes an example in which the system 100 performs the operations from S610 to S680 shown in FIG. 6 to manage mobile objects, such as mobile object 10, and events on a map area. FIG. 6 shows one example of the operational flow of the system 100 shown in FIGS. 1-5, but the system 100 shown in FIGS. 1-5 is not limited to using this operational flows explained below. Also, the operational flow in FIG. 6 may be performed by other systems.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the mobile object (S620). The system may perform the process of S620 if a user (passenger) initializes a setting of a mobile object and any passengers of the mobile object, before starting to drive the mobile object.

After S620, a gateway apparatus, such as the gateway apparatus 160, of the system may acquire a car probe data from the mobile object (S630). Although the system may acquire the car probe data from the plurality of the mobile objects, the system acquiring a car probe data from one mobile object (which, may be referred to as "a target mobile object") is explained in the below description. The car probe data may include information detected by the target mobile object, such as current position information of the target mobile object, a speed and/or direction of the target mobile object, and event information observed by the target mobile object (e.g., occurrence of ABS, detection of obstacles, or the like). In one embodiment, the position information may include an edge ID of an edge on which the target mobile object exists and the distance between the current location of the target mobile object and the one end of the edge.

Next, the gateway apparatus may determine a region on which the target mobile object is traveling based on the position information of the car probe data of the target mobile object (S640). In one embodiment, the gateway apparatus may inquire a region manager, such as the region manager 140, about the region on which the mobile object exists. A determining section, such as the determining section 146, of the region manager may determine the region the target mobile object and provide the gateway apparatus with the information of the region of the target mobile object. The gateway apparatus may provide an event server, such as the event server 210, that manages the determined region and a mobile object server, such as the mobile object server 220, that manages the determined region with the car probe data.

Next, the event server that is provided with the car probe data of the target mobile object may process events for the mobile objects (S650). The event server may manage event information based on the car probe data for notification of events to the target mobile object.

After S650, the mobile object server that is provided with the car probe data of the target mobile object may manage a mobile object agent for the target mobile object (S660).

After S660, the system determines whether to end the process for the target mobile object. In one embodiment, the gateway apparatus may determine whether the car probe date indicates the engine stop of the target mobile object. If the system determines not to end the process, then the system proceeds with the process of S630 for the target mobile object. If the system determines to end the process, then the system ends the process for the target mobile object, and may continue the process for other mobile objects.

As described above, the system manages mobile objects by utilizing mobile object agents realized by the plurality of the mobile object servers. Since the system can transfer the mobile object agent between the mobile object servers, it can efficiently manage the mobile objects traveling around the plurality of regions. Furthermore, the system collects car probe data from the mobile objects and manages events generated from the car probe data by utilizing the event agents. Since each event server divides a number of events occurring on its managing regions into a plurality of areas by utilizing the event agents, it can efficiently handle event information.

The process of S610 may be performed once before starting processes S620-S680. The process of S620-S680 may be performed for every mobile object.

Figure 7:
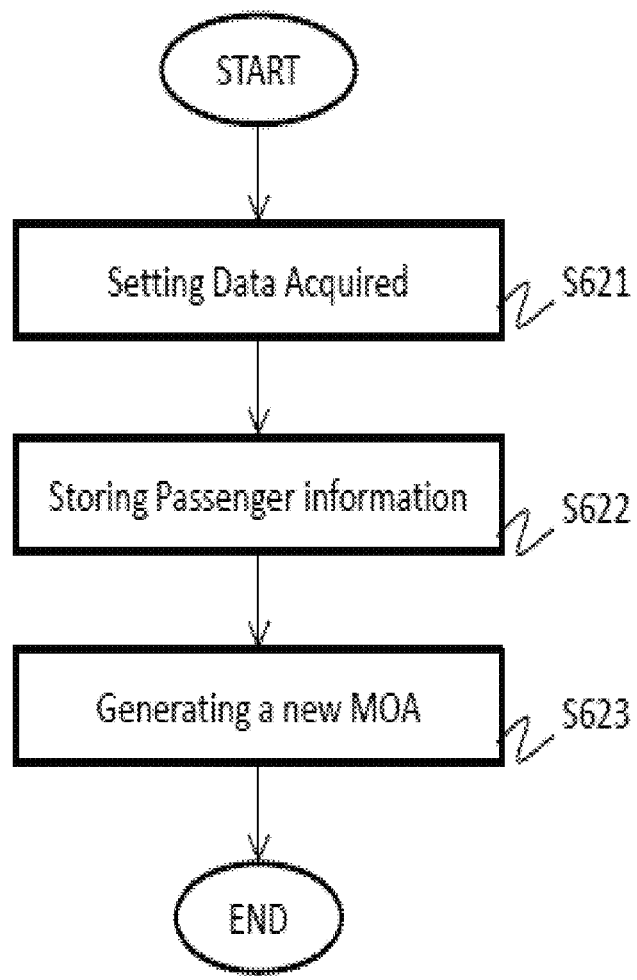
FIG. 7 shows an operational flow of S620 according to the present embodiment.

FIG. 7 shows an operational flow of an initialization process for a mobile object, according to an embodiment of the present invention. The present embodiment describes an example in which the system performs an initialization process, such as the initialization process of S620 of FIG. 6, through processes S621 to S623 shown in FIG. 7.

First, a gateway apparatus receives a setting data (including an ID of the mobile object, an ID(s) of passenger(s) and position information of the mobile object) from the mobile object (S621). The gateway apparatus determines one mobile object server that manages the mobile object based on the position information of the mobile object. The gateway apparatus provides the determined mobile object server with the setting data. Then, the determined mobile object server obtains information (e.g., ID(s) of the passenger(s)) of at least one passenger of the mobile object from the setting data of the mobile object.

Then, the mobile object server may request the object agent of the object server for the mobile object to store the information of the at least one passenger of the mobile object (S622). For example, each mobile object may be mapped to each object agent of the object servers based on values of the IDs of the mobile objects, and the mobile object server may identify one object agent corresponding to the ID of the mobile object based on the calculation using the ID. Then, the mobile object server may provide the object server managing the identified object agent with the setting data including the position information, the ID of the mobile object, and ID(s) of passenger(s) of the mobile object via the gateway apparatus.

Next, the object server stores the information of passenger(s) on an object agent. In one embodiment, each of passengers may be preliminarily mapped to each of the passenger servers based on values of the IDs of passengers, and the passenger servers may have information of passengers. The object server may identify one passenger server corresponding to the ID of a passenger based on the calculation using the ID. The object server may receive, via the gateway apparatus, the information of passengers from the passenger server corresponding to the ID. Then, the object server may store or update the information of the mobile object and the passengers of the mobile object, in the object agent for the mobile object. The object server may include the information of a region that the mobile object currently exists, in the object agent.

Next, the mobile object server 220 managing the region in which the mobile object 10 exists generates a new mobile object agent for the mobile object 10 (S623). In one embodiment, the mobile object server 220 may copy the information of the object agent for the mobile object 10 to the newly generated mobile object agent. For example, the mobile object server 220 may store the information of the mobile object 10 and the information of the at least one passenger of the mobile object 10 in the newly generated mobile object agent for the mobile object 10.

Figure 8:
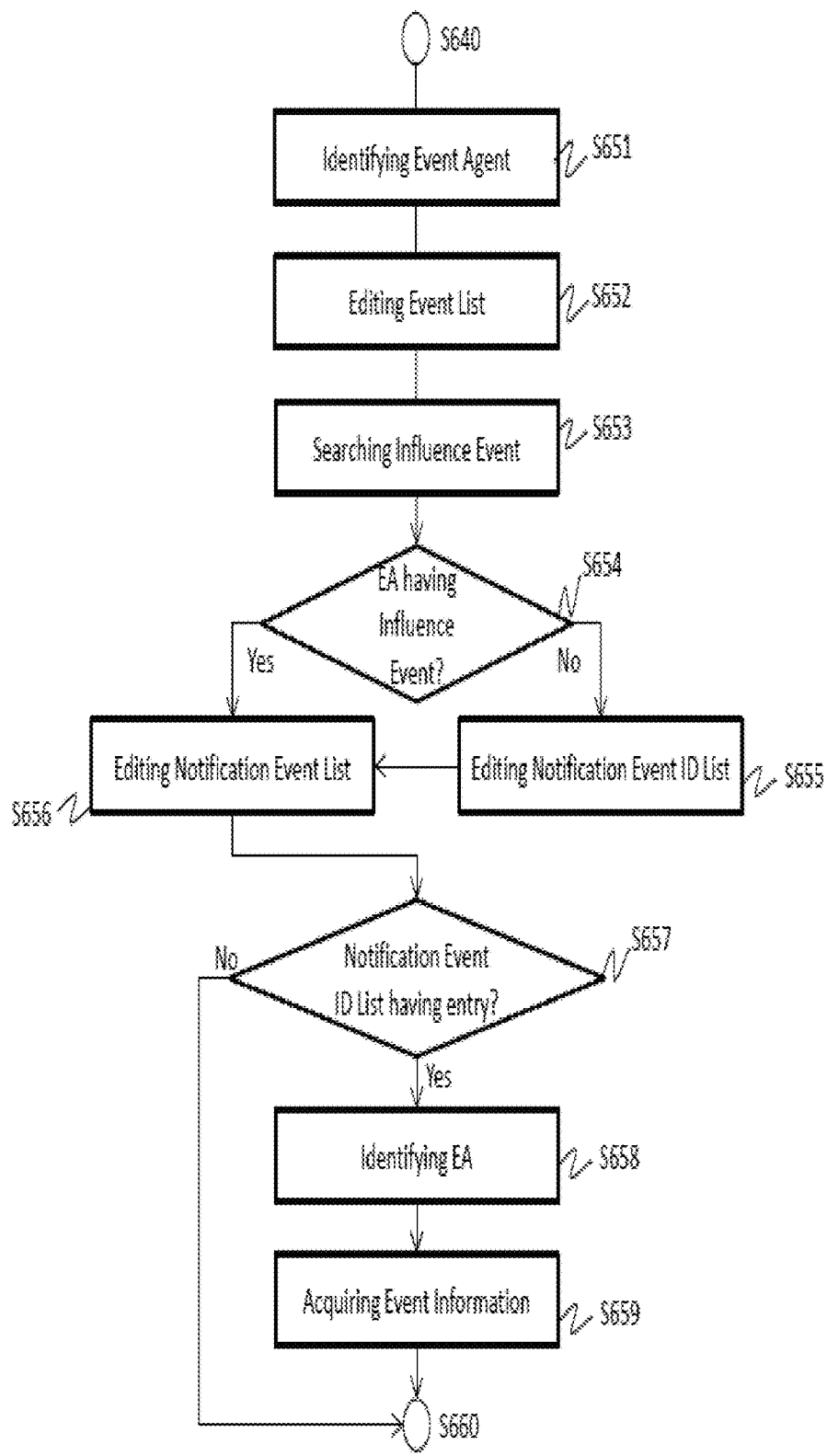
FIG. 8 shows an operational flow of S650 according to the present embodiment.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event sever determines one event agent from the plurality of event agents based on the position information of the target mobile object. The determined event agent may be referred to as "target event agent." For example, the event server determines a target route (or an edge of the map data) of the target mobile object based on the position information and the map data, and selects, as a target event agent, an event agent that manages an area including the target route of the target mobile object indicated by the car probe data. In another embodiment, the car probe data of a target mobile object may include the information of the target route of the target mobile object.

Next, the event server may edit event lists by the target event agent based on the car probe data (S652). In one embodiment, the target event agent may generate or update information of events (e.g., an edge that an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search routes (or edge IDs) apart from the target route within the threshold distance based on the topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S655 and if negative, the event server proceeds with the process S656.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target mobile object, by the target event agent. The notification event list is a list of events that may be helpful to the target mobile object traveling on the target route. The notification event list may include target events and influence events of the target events. The target event agent may add entries of the target events and the influence events in its managing event list for notification.

Next, the event server determines, by the target event agent, whether the notification event ID list has at least one entry. If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 9, the edge 0001 has influence event 0114. This may mean that a mobile object traveling on the edge 0001 is influenced by the event 0114 that has occurred apart from edge 0001 within a threshold distance. In response to receiving the car probe data including the position information indicating that the target mobile object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target mobile object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other mobile objects. In this case, the target event agent counts occurrences of a candidate event observed by a plurality of mobile objects (including the target mobile object and other mobile objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
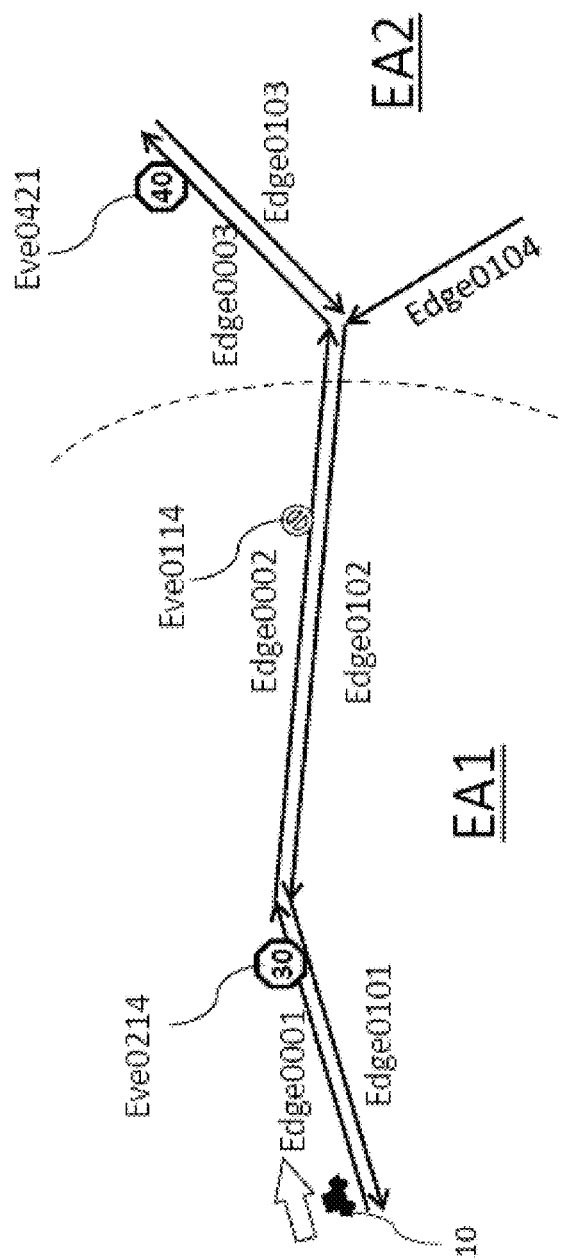
FIG. 12 shows a mobile object 10 and events according to one embodiment.

FIG. 12 shows a mobile object and events, according to an embodiment of the present invention. In the embodiment of FIG. 12, the target mobile object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve0214) and the influence event (Eve 0114) for the target mobile object 10.

In the embodiment of FIG. 12, the mobile object agent managing target mobile object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve0421) to send a notification event list containing information of the influence event(s) if the influence event is located outside of the area including the target route (Edge 0001).

Figure 13:
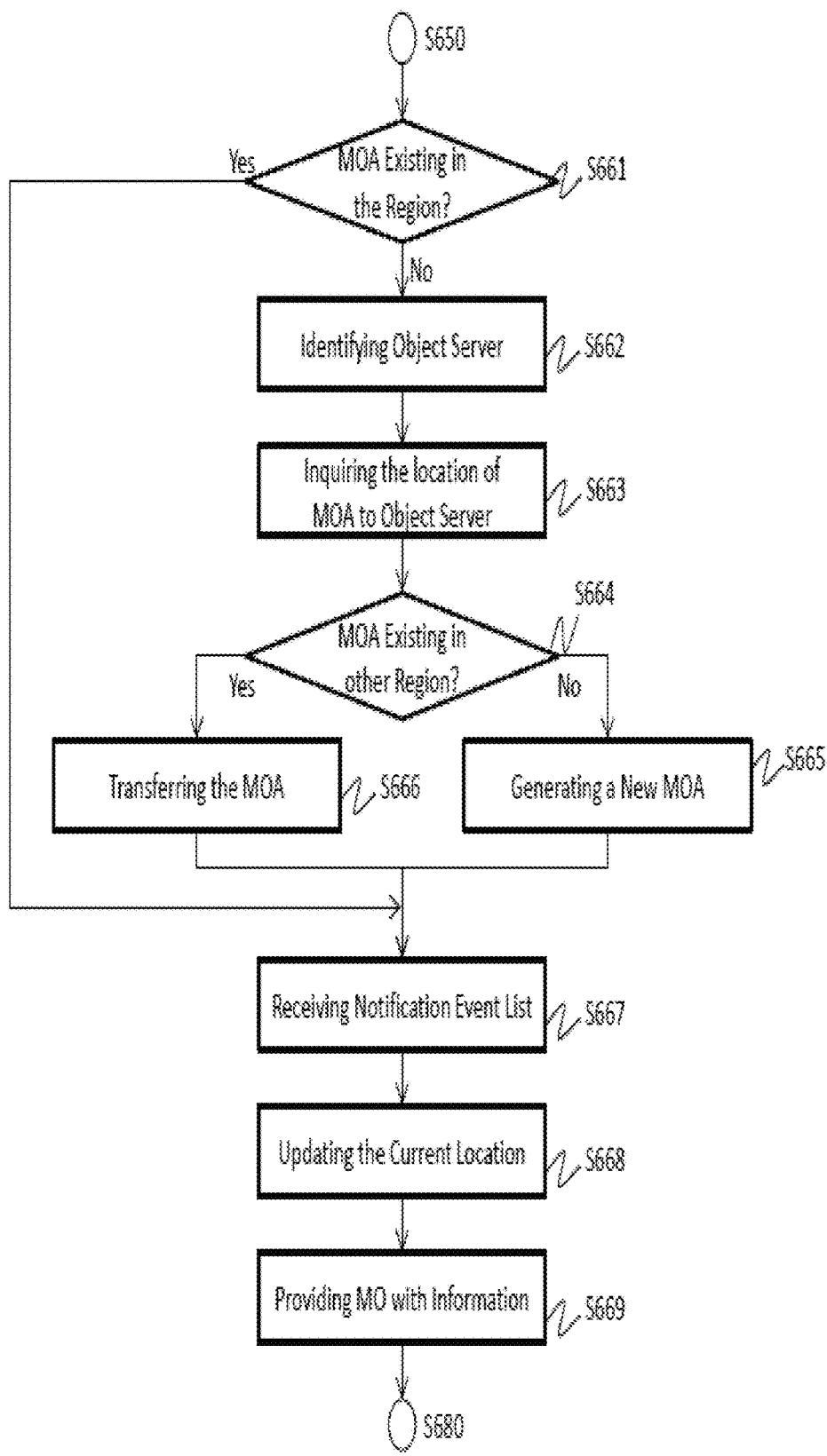
FIG. 13 shows an operational flow of S660 according to the present embodiment.

FIG. 13 shows an operational flow of mobile object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target mobile object exists in the region determined to be the region of the mobile object, such as the region determined at S640. In other words, the mobile object server determines whether the mobile object server manages the mobile object agent of the target mobile object. If the decision is positive, then the mobile object server proceeds with the process S667, and if negative, the mobile object server proceeds with the process S662.

At S662, the mobile object server may identify an object server that includes the object agent containing the information of the target mobile object. In one embodiment, the mobile object server may identify the object server in the same manner described in S622.

Next, at S663, the mobile object server may inquire the object server 230 identified at S662 for the location of the mobile object agent of the target mobile object. The object server may refer to the object agent of the target mobile object, obtain information of the mobile object server that currently manages the mobile object agent MOA of the target mobile object, if it exists, and provide the mobile object server with the information.

Next, the mobile object server may determine whether the mobile object agent for the target mobile object exists in any other regions. In other words, the mobile object server may determine which mobile object server manages the mobile object agent for the target mobile object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target mobile object. The mobile object server may generate the mobile object agent MOA for the target mobile object by obtaining information of the target mobile object from the object server that includes the object agent containing the information of the target mobile object. In one embodiment, the mobile object server may generate the new mobile object agent in the same manner described in S623. The mobile object server may also communicate with the object server via the gateway apparatus, and register the current region of the target mobile object in the object agent corresponding to the target mobile object. By generating the new mobile object agent, the system can handle a new mobile object 10 that has been not managed by the mobile object server.

At S666, the mobile object server may transfer the mobile object agent from the other mobile object server determined to manage the mobile object agent for the target mobile object at S664. In one embodiment, the mobile object server may receive information of the mobile object agent for the target mobile object from the other mobile object server, and generate a new mobile object agent including the received information. The mobile object server may also communicate with the object server via the gateway apparatus, and register the current region of the target mobile object in the object agent of the target mobile object.

Next, at S667, the mobile object server may receive a notification event list for the target mobile object. In one embodiment, the mobile object server first determines the target route where the target mobile object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target mobile object by the mobile object agent. In one embodiment, the mobile object agent for the target mobile object updates the current location of the target mobile object based on the position information of the car probe data.

At S669, the mobile object server may execute the mobile object agent for the target mobile object to provide the target mobile object with information that assists the target mobile object with traveling in the geographic space based on the information included in the event list. In one embodiment, the mobile object agent may provide the target mobile object with information of events on the notification event list.

In one embodiment, the at least one mobile object server may execute the mobile object agent for the target mobile object to provide the target mobile object with information that assists the target mobile object with traveling in the geographic space based on the information of the at least one passenger of the target mobile object. For example, the mobile object agent may provide the target mobile object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target mobile object).

The action list may include commands to the target mobile object for automatic driving and/or driving assist. In one embodiment, the mobile object agent may include information that the passenger is sensitive to rough driving, and then the mobile object agent may provide commands to gently drive the target mobile object. In one embodiment, the mobile object agent may include information of driving skill of a driver passenger, and then provide different commands depending on the skill of the driver. The mobile object server may provide the target mobile object with the information via the gateway apparatus.

As described above, the mobile object server receives information from the target mobile object in the region assigned to the mobile object server, and generates the mobile object agent for the target mobile object if there is no mobile object server among the plurality of mobile object servers that is executing the mobile object agent.

Figure 14:
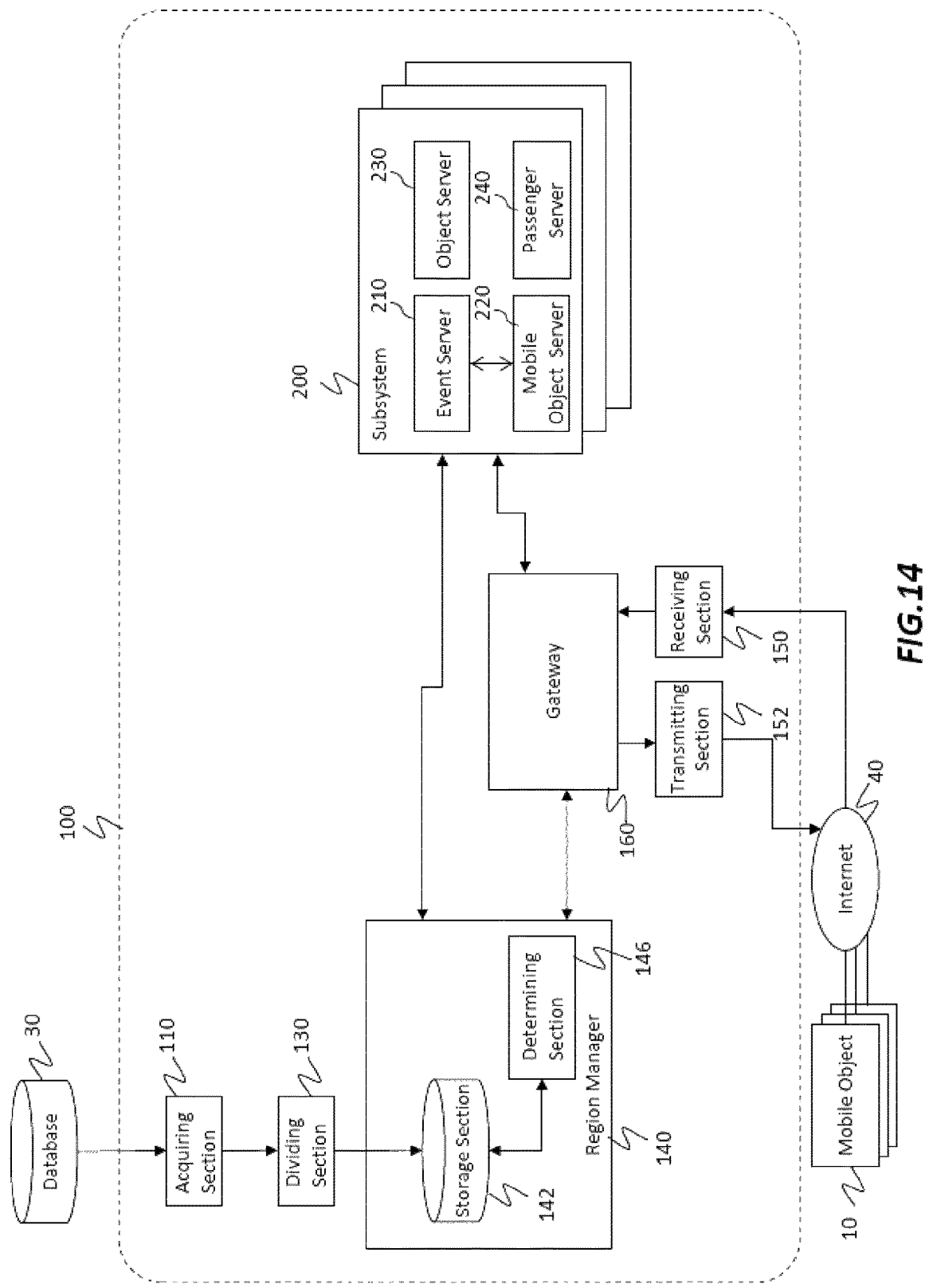
FIG. 14 shows a second exemplary configuration of the system 100 according to the present embodiment.

FIG. 14 shows an exemplary configuration of the system 100, according to an embodiment of the present invention. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

Figure 15:
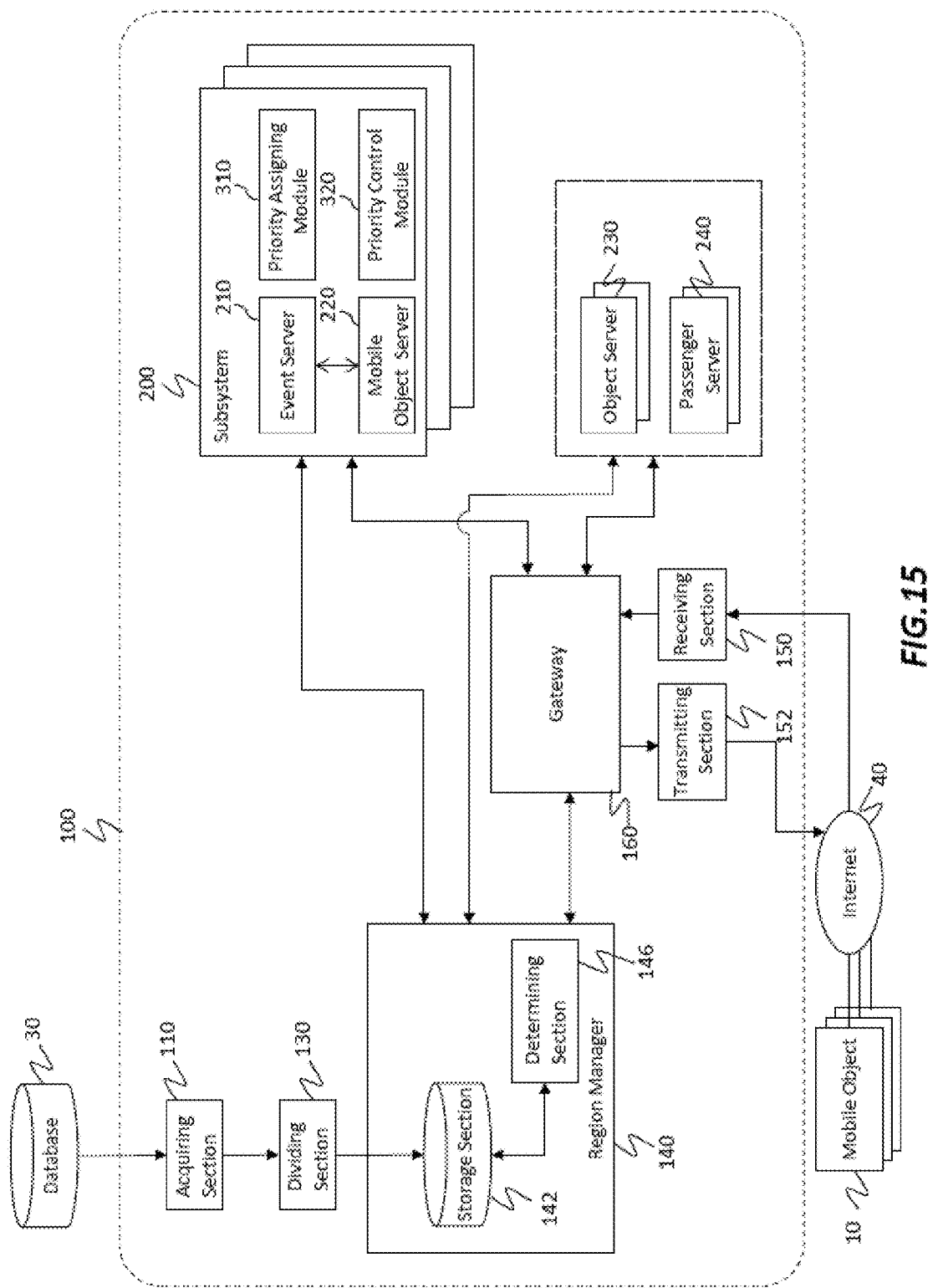
FIG. 15 shows a third exemplary configuration of the system 100 according to the present embodiment.

FIG. 15 shows an exemplary configuration of a system 100 according to the present embodiment. In the system 100 according to the present embodiment, components having substantially the same operation as components of the system 100 of the embodiment shown in FIGS. 3 and 14 are given the same reference numerals, and redundant descriptions are omitted. In the present embodiment, the mobile object server 220 may be operable to assist a plurality of mobile objects in a geographic space. The system 100 manages the transit of a plurality of the mobile objects 10. Specifically, the subsystems 200 instruct a plurality of mobile objects 10 within a geographic space being managed to move based on priority. In the present embodiment, the subsystems 200 each include a priority assigning module 310 and a priority control module 320.

Each priority assigning module 310 may be operable to communicate with the mobile object server 220 and assign priority to each of the plurality of mobile objects 10. The priority assigning module 310 may be operable to assign priority to each mobile object 10 based on mobile object information of each mobile object 10 held by the mobile object server 220. For example, the priority assigning module 310 assigns a priority to each of one or more mobile objects 10 in response to receiving mobile object information of the one or more mobile objects from the mobile object server 220, and supplies the mobile object server 220 with each assigned priority.

The priority assigning module 310 may be operable to assign priority to each mobile object according to at least one of the number of people and the state of people riding in each mobile object 10. Furthermore, the priority assigning module 310 may be operable to assign the priority of each mobile object 10 according to the type, purpose, urgency, and/or destination of each mobile object 10. The priority assigning module 310 may be operable to assign the priority of each mobile object 10 according to characteristics of the routes travelled by the mobile objects 10, e.g. the ability to pass other mobile objects, the number of lanes, the speed limit, the traffic conditions, or the time of day.

The priority assigning module 310 may change the assigned priorities according to the state of the routes travelled by the mobile objects 10 and the state of the mobile objects 10. For example, if a plurality of mobile objects 10 that each have only one passenger are moving within a range of a mobile object 10 having two passengers, the priority assigning module 310 increases the priority of the mobile objects 10 having two passengers. Furthermore, if a plurality of mobile objects 10 that each have three or more passengers are moving in a range of a mobile object 10 having two passengers, the priority assigning module 310 may decrease the priority of the mobile object 10 having two passengers. In this way, the priority assigning module 310 may be operable to change the setting conditions for priority according to the state of the routes.

The priority control module 320 may be operable to perform priority movement control enabling a mobile object 10 having higher priority to progress faster than a mobile object having lower priority, based on the priority assigned to each of the plurality of mobile objects 10. The priority control module 320 may be operable to perform priority movement control that includes instructing lane changes to the mobile objects 10, based on the priority assigned by the priority assigning module 310.

At least one of the plurality of subsystems 200 according to the present embodiment includes a priority assigning module 310 and a priority control module 320 such as described above, and manages the transit of a plurality of mobile objects 10 in a geographic space being managed. The management operation performed by the subsystem 200 is described below.

Figure 16:
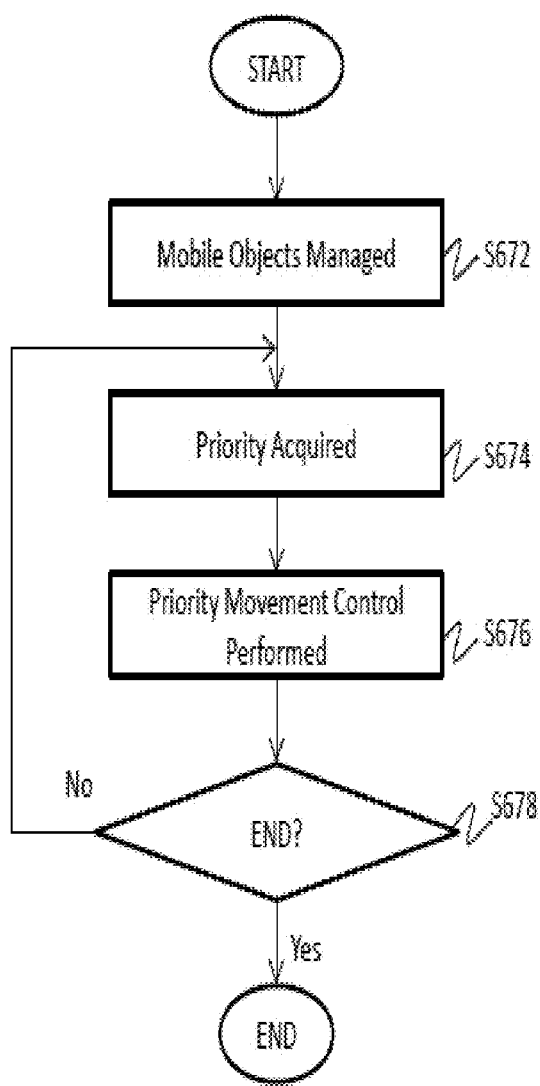
FIG. 16 shows an exemplary configuration of a portion of the operational flow of the system 100 according to the present embodiment.

FIG. 16 shows an exemplary configuration of a portion of the operational flow of the system 100 according to the present embodiment. The mobile object server 220 according to the present embodiment performs the operational flow shown in FIG. 16 to assist with the movement of a plurality of mobile objects in a geographic space. Specifically, the operational flow of FIG. 16 may be performed by the system 100 in addition to or instead of the processing at S660 (Mobile object Server Processing) of the mobile object server described in FIGS. 6 and 13.

First, at S672, the mobile object server 220 may use the plurality of mobile object agents MOA corresponding to a plurality of mobile objects 10 to manage these mobile objects 10. The mobile object server 220 may use the flow shown in FIG. 13 to associate each of the mobile objects 10 with a mobile object agent MOA in a one-to-one manner.

Next, at S674, each of the plurality of mobile object agents MOA may acquire the priority assigned to the corresponding mobile object 10. Each mobile object agent MOA may supply the priority assigning module 310 with the information of the corresponding mobile object 10 and acquire the priority assigned to the corresponding mobile object 10. Here, the priority control module 320 may receive information concerning the purpose, the destination, the number of passengers, the type of automobile, and the like of the corresponding mobile objects 10 from the plurality of mobile object agents MOA, and assign the priority to each mobile object 10.

Next, at S676, the priority control module 320 may perform priority movement control. The priority control module 320 may receive the position and the priority of each corresponding mobile object 10 from the mobile object agents MOA and transmit movement instructions to each of the mobile object agents MOA based on the positions and priorities of these mobile objects 10. For example, the priority control module 320 transmits information for changing lanes, opening up a lane, letting in a mobile object, and setting a priority route to the mobile object agents MOA.

The subsystem 200 may repeat the processes from S674 to S676 until the priority movement control is finished (S678: No). If the priority movement control is finished (S678: Yes), the subsystem 200 may end this processing and transition to the next process. In the manner described above, the subsystem 200 may perform the priority movement control for a plurality of mobile objects 10 within a geographic space being managed. The following describes an example of the priority movement control.

Figure 17:
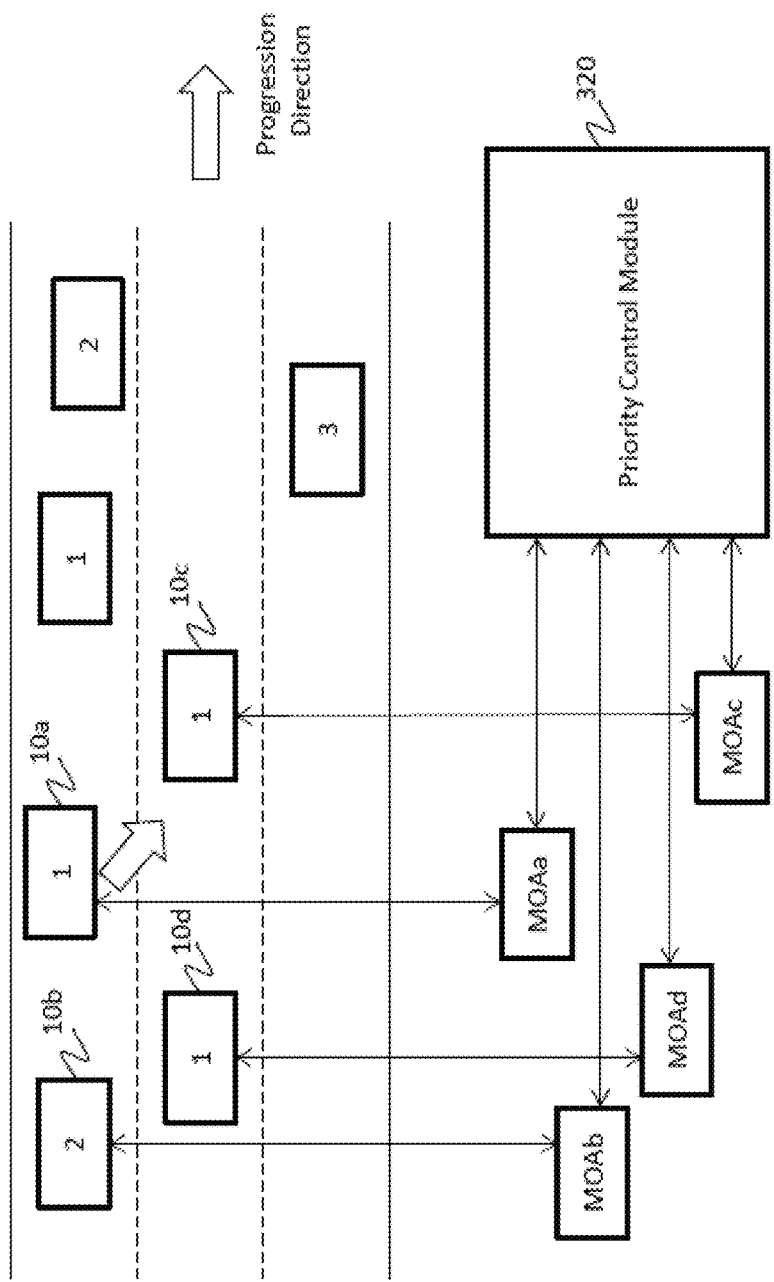
FIG. 17 shows a first example of the priority movement control performed by the system 100 according to the present embodiment.

FIG. 17 shows a first example of the priority movement control performed by the system 100 according to the present embodiment. In the first example of the priority movement control, the priority control module 320 instructs a lane change for a mobile object 10 having low priority. FIG. 17 shows an example in which a plurality of mobile objects 10 with different priorities, e.g. a first mobile object 10a with a priority of 1 and a second mobile object 10b with a priority of 2, are in the same lane with a distance therebetween that is less than or equal to a threshold value or reference value. In FIG. 17, priorities from 1 to 3 are assigned to the mobile objects 10. FIG. 17 shows an example in which a priority that is a larger number indicates higher priority.

The priority control module 320 may be operable to, if the second mobile object 10b having higher priority is positioned behind the first mobile object 10a having lower priority in the same lane, perform priority movement control that includes instructing a lane change for at least one of the first mobile object 10a and the second mobile object 10b. For example, the priority control module 320 instructs the mobile object agent MOAa corresponding to the first mobile object 10a to open up the lane, e.g. make a lane change.

In response to receiving the instructions from the priority control module 320, the mobile object agent MOAa may transmit instructions for opening up the lane to the first mobile object 10a. As a result, the priority control module 320 can enable the second mobile object 10b to move with priority. The priority control module 320 may control the other mobile objects 10 such that the first mobile object 10a can quickly open up the lane.

The priority control module 320 may be operable to, if there are instruction for the first mobile object 10a to open up the lane by making a lane change, instruct a third mobile object 10c in a lane into which the first mobile object 10a will move to make space for the lane change of the first mobile object 10a. For example, the priority control module 320 instructs the mobile object agent MOAc corresponding to the third mobile object 10c to make space, e.g. to accelerate, for the lane change of the first mobile object 10a. Instead of or in addition to this, the priority control module 320 may instruct the mobile object agent MOAd corresponding to a fourth mobile object 10d to make space, e.g. to decelerate, for the lane change of the first mobile object 10a.

If priority movement control is being performed that includes acceleration or deceleration of a mobile object 10, the priority control module 320 may determine whether to perform the priority movement control according to the movement speeds of the mobile object 10 and other mobile objects 10 moving within a range that is a reference distance from the mobile object 10. The priority control module 320 may be operable to perform the priority movement control between the first mobile object 10a and the second mobile object 10b on a condition that the speed of the first mobile object 10a is less than or equal to a predetermined reference speed.

The priority control module 320 may determine whether to perform the priority movement control according to a priority distribution among a plurality of mobile objects 10. If the ratio of the number of mobile objects 10 to be given priority in a single route to the number of mobile objects 10 not to be given priority in this route is less than or equal to a predetermined reference ratio, the priority control module 320 may determine at least one lane in this route to be a priority lane. In this case, the priority control module 320 may be operable to perform priority movement control that includes guiding a mobile object 10 that is to be given priority in this route into the priority lane. In other words, the priority control module 320 may cause a mobile object 10 with low priority to make a lane change into a lane that is not a priority lane.

Furthermore, the priority control module 320 may be operable to change at least one of the frequency of the priority movement control and the time used for one instance of the priority movement control, according to the state of the route. For example, when there is bad weather such as rain, snow, or strong winds, the priority control module 320 may change to processing for reducing the frequency of the priority movement control, processing causing the intervals between mobile objects 10 to be larger than the intervals when the weather is good, and/or processing for making the execution time from the start to the end of the priority movement control longer than the execution time when the weather is good.

If a plurality of mobile objects 10 are moving at speeds within a reference range, the priority control module 320 may reduce the frequency of the priority movement control. For example, if mobile objects 10 moving on each route are moving smoothly at speeds near the speed limit, the priority control module 320 reduces the frequency of the priority movement control that is not priority movement control caused by emergency vehicles or the like.

FIG. 17 shows an example in which, when the second mobile object 10b having higher priority is positioned behind the first mobile object 10a having lower priority in the same lane, the priority control module 320 instructs the first mobile object 10a having lower priority to make a lane change. Instead of this, the priority control module 320 may instruct the second mobile object 10b having higher priority to make a lane change.

Figure 18:
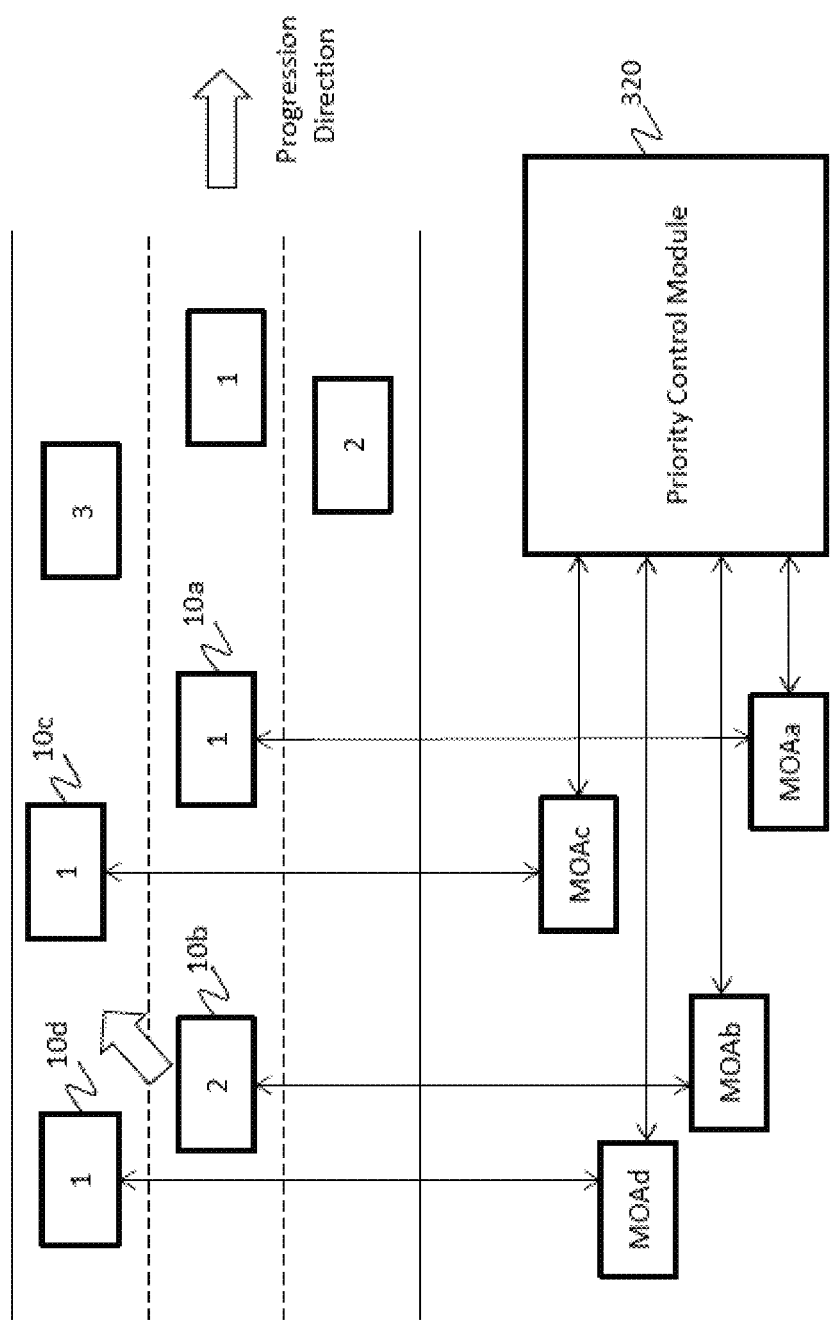
FIG. 18 shows a second example of the priority movement control performed by the system 100 according to the present embodiment.

FIG. 18 shows a second example of priority movement control performed by the system 100 according to the present embodiment. In the second example of the priority movement control, the priority control module 320 instructs the mobile object 10 having high priority to make a lane change. In FIG. 18, components that realize substantially the same priority movement control operations as components in the embodiment shown in FIG. 17 are given the same reference numerals and redundant descriptions are omitted. FIG. 18 shows an example in which a plurality of mobile objects 10 having different priorities are at a distance from each other that is less than or equal to a threshold value or reference value in the same lane, in the same manner as in FIG. 17.

The priority control module 320 may instruct the mobile object agent MOAb corresponding to the second mobile object 10b to make a lane change. The mobile object agent MOAb may transfer instructions for a lane change to the second mobile object 10b in response to receiving the instructions from the priority control module 320. As a result, the priority control module 320 can cause the second mobile object 10b to move with priority. In this case, the priority control module 320 may control other mobile objects 10 in a manner to enable the second mobile object 10b to make the lane change quickly.

For example, the priority control module 320 instructs the mobile object agent MOAc corresponding to the third mobile object 10c to make space, e.g. accelerate, for the lane change of the second mobile object 10b.Instead of or in addition to this, the priority control module 320 may instruct the mobile object agent MOAd corresponding to the fourth mobile object 10d to make space, e.g. decelerate, for the lane change of the second mobile object 10b.

After the second mobile object 10b has made the lane change, the priority control module 320 may further instruct the third mobile object 10c having lower priority and positioned in front of the second mobile object 10b to make a lane change. In other words, if the positional relationship of the second mobile object 10b and the third mobile object 10c after the second mobile object 10b has made the lane change is the same as the positional relationship of the second mobile object 10b and the first mobile object 10a shown in FIG. 17, the priority control module 320 may instruct the mobile object agent MOAc corresponding to the third mobile object 10c to open up the lane.

Figure 19:
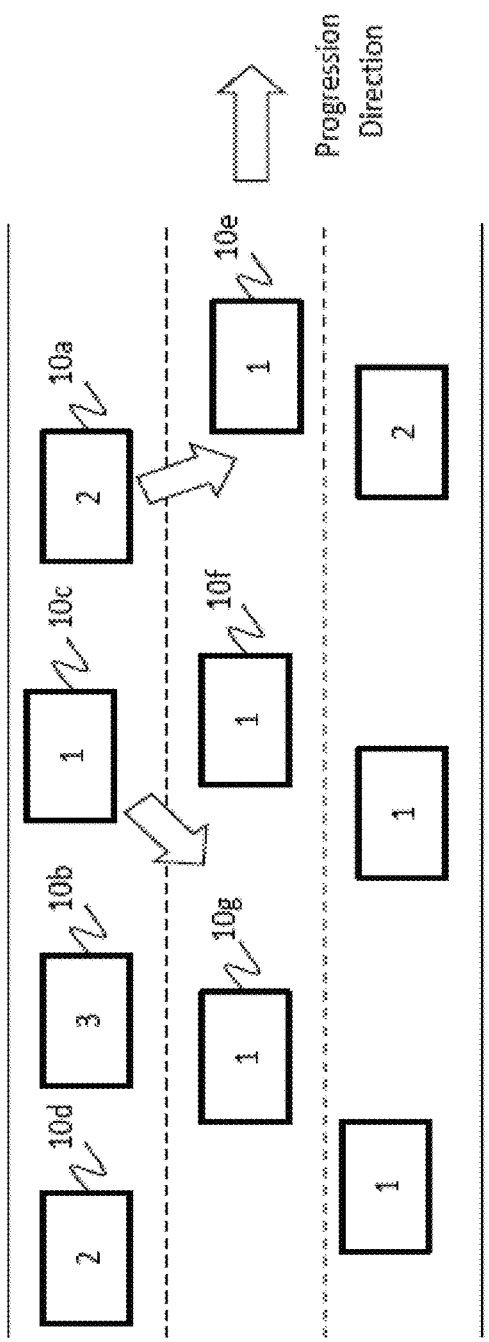
FIG. 19 shows a third example of the priority movement control performed by the system 100 according to the present embodiment.
Figure 20:
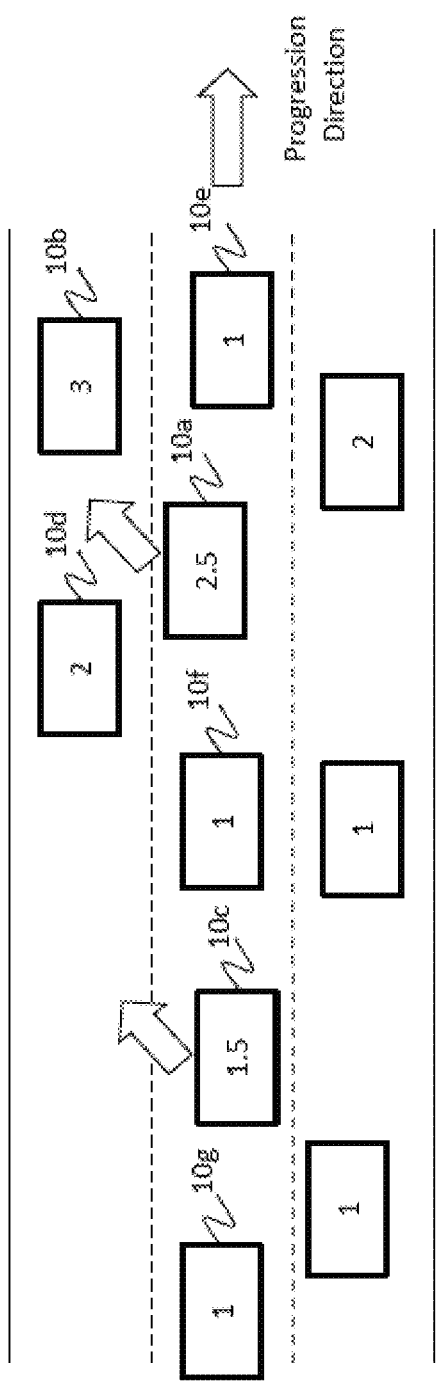
FIG. 20 shows an example in which the priority control module 320 according to the present embodiment causes the second mobile object 10b to move with priority.
Figure 21:
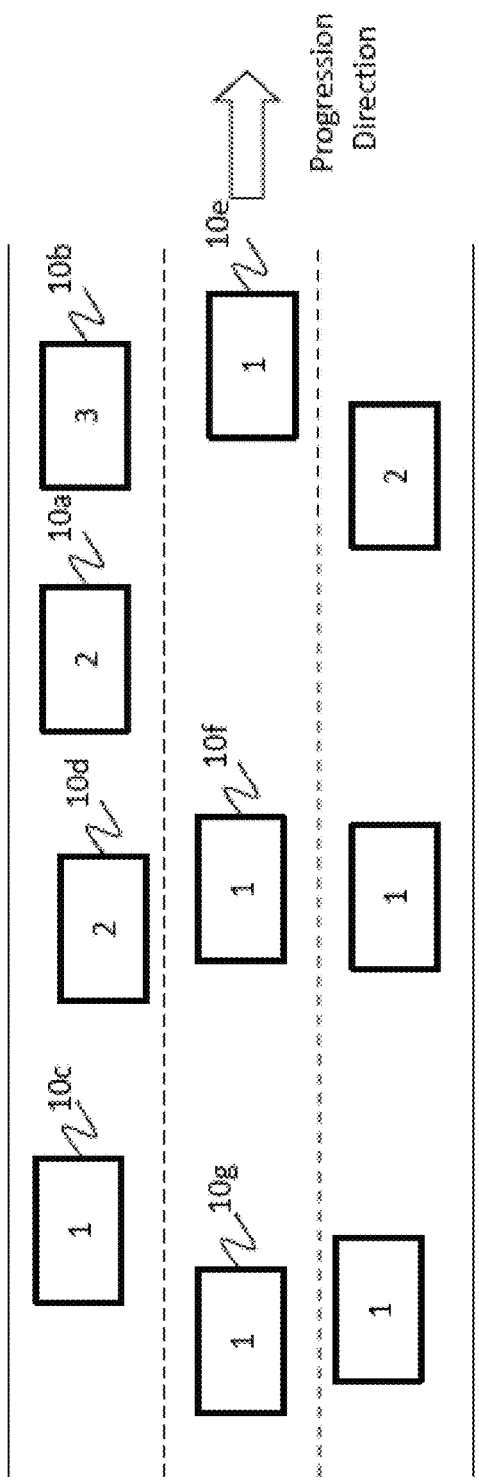
FIG. 21 shows an example of a result realized by the priority control module 320 according to the present embodiment causing the first mobile object 10a and the third mobile object 10c to make lane changes.

FIGS. 19 to 21 show a third example of the priority movement control performed by the system 100 according to the present embodiment. In the third example of the priority movement control, after the priority control module 320 instructs a mobile object 10 with low priority to make a lane change, the priority control module 320 then instructs this mobile object 10 to prioritize making a further lane change. In FIGS. 19 to 21, components that realize substantially the same priority movement control operations as components in the embodiment shown in FIG. 17 are given the same reference numerals and redundant descriptions are omitted. Furthermore, descriptions of the priority control module 320 and the mobile object agents MOA are omitted. FIG. 19 shows an example in which a plurality of mobile objects 10 having different priorities are at a distance from each other that is less than or equal to a threshold value or reference value in the same lane, in the same manner as in FIG. 17.

The priority control module 320 may be operable to, if the second mobile object 10b having higher priority is behind the first mobile object 10a and the third mobile object 10c that have lower priorities, perform priority movement control that includes instructing the first mobile object 10a and third mobile object 10c to make lane changes or instructing the second mobile object 10b to make a lane change. For example, the priority control module 320 instructs the mobile object agent MOAa and the mobile object agent MOAc corresponding respectively to the first mobile object 10a and the third mobile object 10c to open up the lane.

The mobile object agent MOAa and the mobile object agent MOAc may transmit instructions for a lane change to both the first mobile object 10a and the third mobile object 10c, in response to receiving the instructions from the priority control module 320. As a result, the priority control module 320 can cause the second mobile object 10b to move with priority. In this case, the priority control module 320 may control other mobile objects 10 in a manner to enable the first mobile object 10a and the third mobile object 10c to quickly make the lane changes.

FIG. 20 shows an example of a result realized when the priority control module 320 according to the present embodiment causes the first mobile object 10a and the third mobile object 10c to make lane changes so that the second mobile object 10b can move with priority. Specifically, FIG. 20 shows an example in which the first mobile object 10a has made a lane change to be between a fifth mobile object 10e and a sixth mobile object 10f and the third mobile object 10c has made a lane change to be between the sixth mobile object 10f and a seventh mobile object 10g.

In this case, the priority assigning module 310 may be operable to increase the priority of the first mobile object 10a in response to the second mobile object 10b having higher priority passing by the first mobile object 10a having lower priority. FIG. 20 shows an example in which the priority assigning module 310 has increased the priorities of the first mobile object 10a and the third mobile object 10c in response to the second mobile object 10b passing by these mobile objects.

The priority assigning module 310 may add to the first mobile object 10a and the third mobile object 10c a value that is less than the unit of priority assigned to the mobile objects 10. FIG. 20 shows an example in which the priority assigning module 310 assigns priority differing by values of 1, e.g. 1, 2, 3, etc., to the mobile objects 10 and adds a value of 0.5, which is less than 1, to the first mobile object 10a and the third mobile object 10c. In this way, the priority control module 320 may perform the priority movement control of the first mobile object 10a and the third mobile object 10c. For example, the priority control module 320 instructs the mobile object agent MOAa and the mobile object agent MOAc corresponding respectively to the first mobile object 10a and the third mobile object 10c to make lane changes.

FIG. 21 shows an example of a result realized by the priority control module 320 according to the present embodiment causing the first mobile object 10a and the third mobile object 10c to make lane changes. Specifically, FIG. 21 shows an example in which the first mobile object 10a has made a lane change to be between the second mobile object 10b and the fourth mobile object 10d and the third mobile object 10c has made a lane change to be behind the fourth mobile object 10d. In this way, as shown in FIG. 19, the priority control module 320 can control the group of mobile objects including the first mobile object 10a, the third mobile object 10c, the second mobile object 10b, and the fourth mobile object 10d moving in the stated order to be a group of mobile objects including the second mobile object 10b, the first mobile object 10a, the fourth mobile object 10d, and the third mobile object 10c moving in the stated order and having priorities that descend in the stated order.

Furthermore, after the priority movement control process performed by the priority control module 320, the priority assigning module 310 can perform the priority movement control without changing the order in which a plurality of mobile objects having the same priority are moving by changing the priorities of the mobile objects 10. FIGS. 19 to 21 show examples in which the priority assigning module 310 changes the priorities of the first mobile object 10a and the third mobile object 10c to enable the second mobile object 10b to move with priority, without changing the order of the first mobile object 10a and the fourth mobile object 10d having the same priority.

The priority assigning module 310 may be operable to change the priority of the first mobile object 10a to be the original priority after the priority assigning module 310 has increased the priority of the first mobile object 10a, if the priority control module 320 has performed the priority movement control for the first mobile object 10a. FIG. 21 shows an example in which the priority assigning module 310 has returned the priorities of the first mobile object 10a and the third mobile object 10c to their original values.

Figure 22:
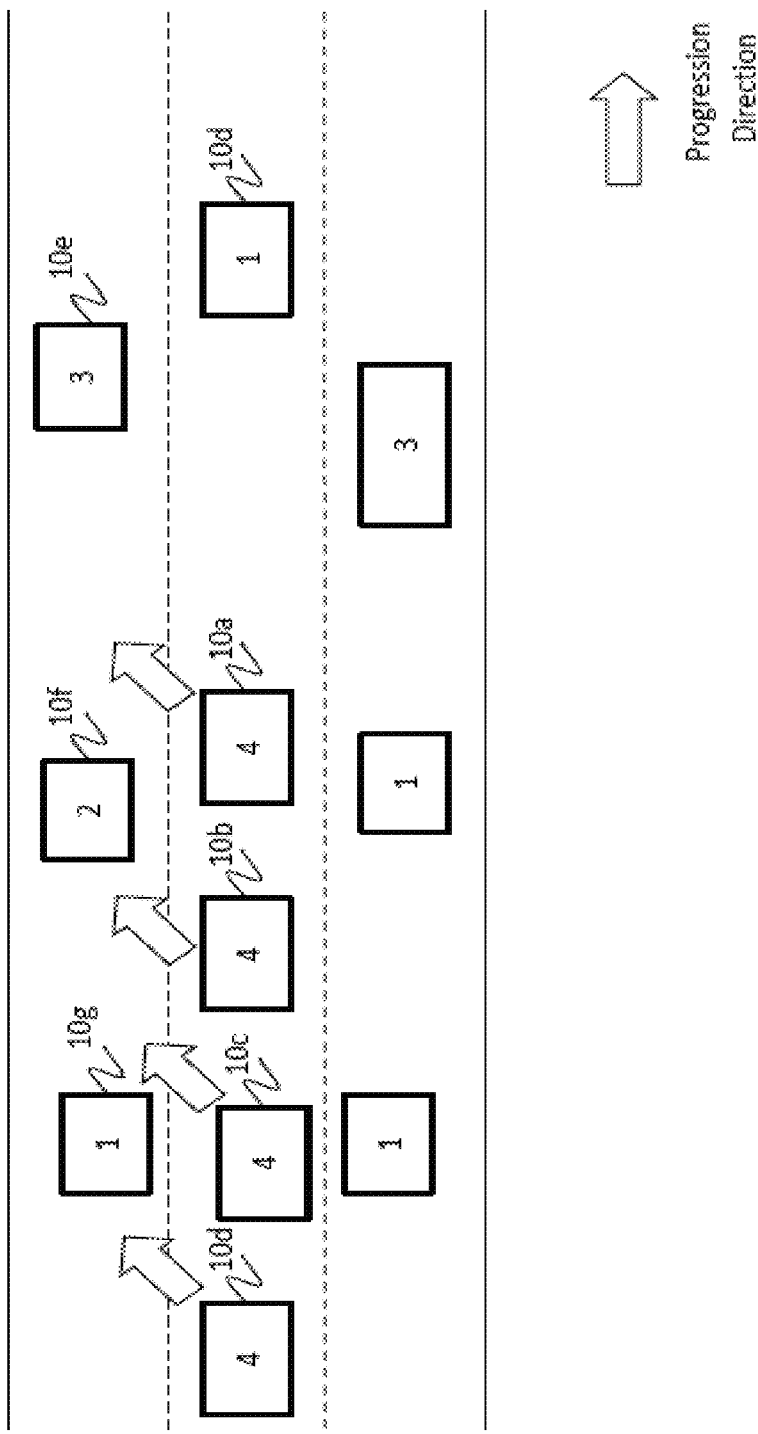
FIG. 22 shows a fourth example of the priority movement control performed by the system 100 according to the present embodiment.
Figure 23:
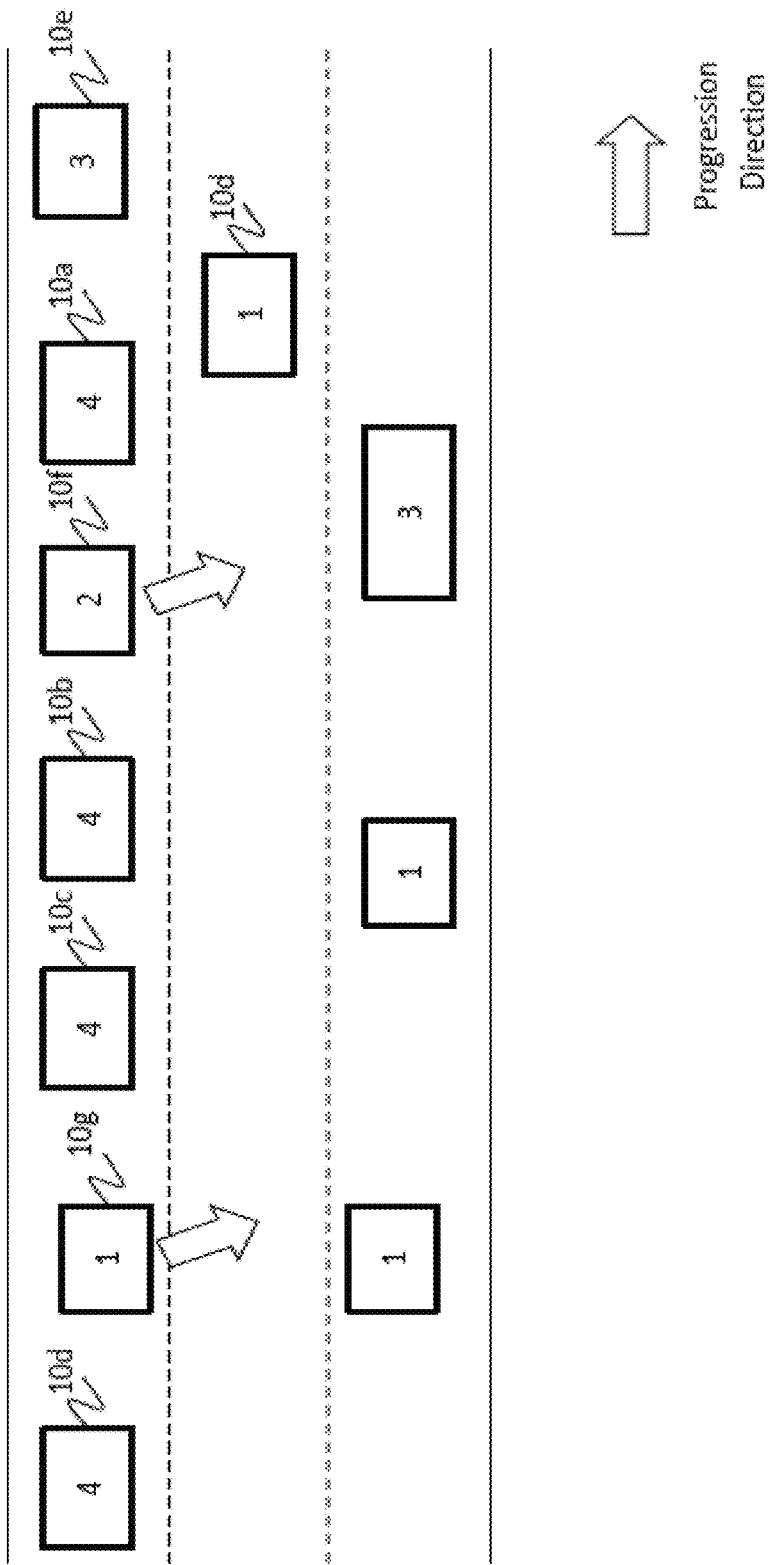
FIG. 23 shows an example of a result realized by the priority control module 320 according to the present embodiment causing each portion of the mobile objects 10 moving in a group to make a lane change.
Figure 24:
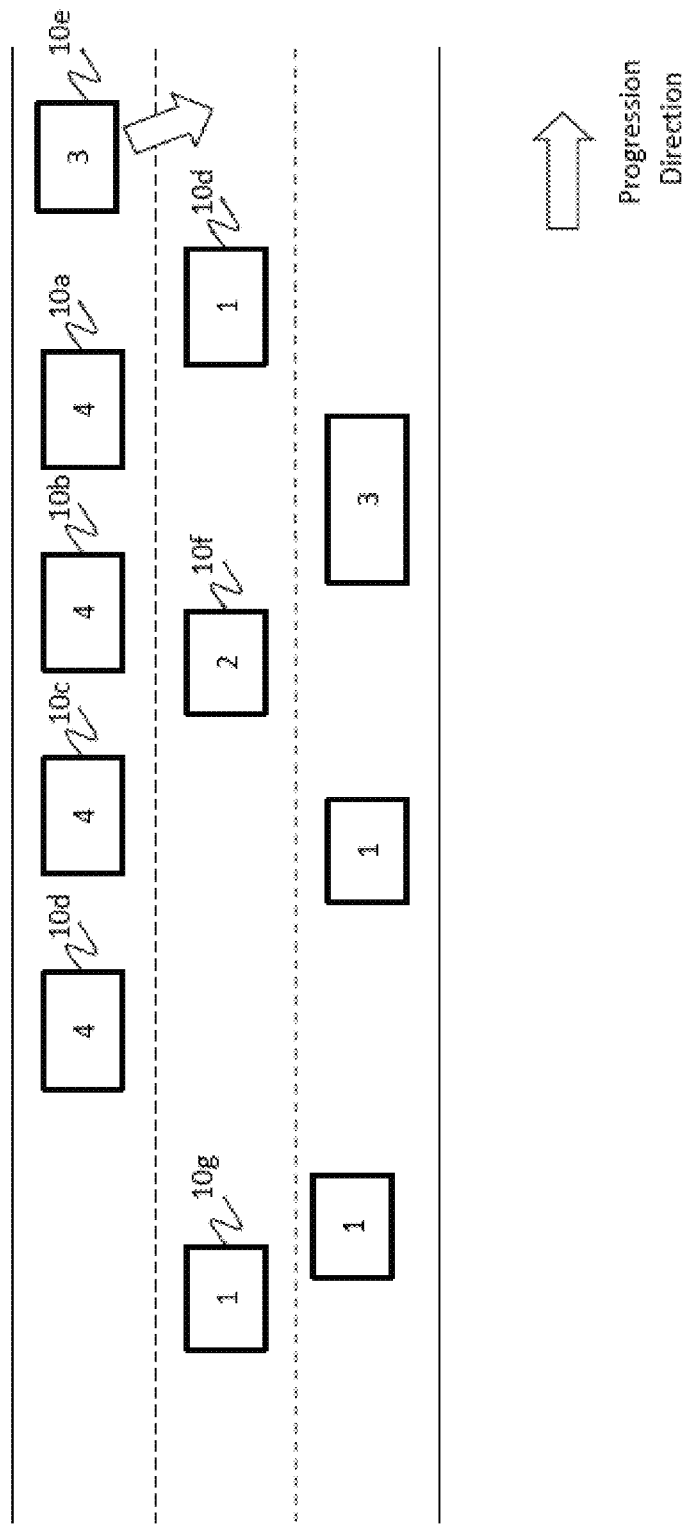
FIG. 24 shows an example of a result realized by the priority control module 320 of the present embodiment causing a mobile object 10 that is not included in a group to make a lane change.

The system 100 according to the present embodiment described above may perform the priority movement control on a plurality of mobile objects 10 moving in a group. FIGS. 22 to 24 show a fourth example of the priority movement control performed by the system 100 according to the present embodiment. In the fourth example of the priority movement control, a process similar to the priority movement control described in FIGS. 17 and 18 is performed by the priority control module 320 on a group that includes a plurality of mobile objects 10.

The priority assigning module 310 may be operable to, if there are two or more mobile objects 10 moving in a group, increase the priorities of the two or more mobile objects 10 more than in a case where these mobile object 10 are moving independently. When a plurality of mobile objects 10 are moving, the priority assigning module 310 may judge whether two or more of the mobile objects 10 are moving in a group based on information such as the distance between automobiles, the movement progression, and the destinations. FIG. 22 shows an example in which the priority assigning module 310 assigns priorities to the two or more mobile objects 10 judged to be moving in a group that are higher than the priorities would be for mobile objects 10 moving independently.

Specifically, FIG. 22 shows an example in which the priority assigning module 310 assigns priorities with values of from 1 to 3 to the mobile objects 10 moving independently and assigns priorities with a value of 4 to the two or more mobile objects 10 moving in a group. The priority control module 320 may perform the priority movement control according to the priorities assigned in this manner. For example, if a mobile object 10 with low priority is in front of a plurality of mobile objects 10 moving in a group by a distance that is less than or equal to a reference distance in the same lane, the priority control module 320 instructs this mobile object 10 with low priority to make a lane change.

If a mobile object 10 with low priority at a distance from a plurality of mobile objects 10 moving in a group that is less than or equal to a reference distance in the same lane, the priority control module 320 may instruct the mobile objects 10 moving in the group to make lane changes. In this case, the priority control module 320 may be operable to instruct the lane change to each portion of the two or more mobile objects 10 moving in the group.

For example, the priority control module 320 instructs the first mobile object 10a to make a lane change to be between the fifth mobile object 10e and the sixth mobile object 10f. The priority control module 320 may instruct the second mobile object 10b and the third mobile object 10c to make a lane change to be between the sixth mobile object 10f and the seventh mobile object 10g. The priority control module 320 may instruct the fourth mobile object 10d to make a lane change to be behind the seventh mobile object 10g.

FIG. 23 shows an example of a result realized by the priority control module 320 according to the present embodiment causing each portion of the mobile objects 10 moving in a group to make a lane change. The priority control module 320 may be operable to, if there is another mobile object 10 that is not within the group including the two or more mobile objects 10 in the lane that is the destination of the lane change to be made by the two or more mobile objects 10 moving in the group, instruct this other mobile object 10 to make a lane change. Specifically, the priority control module 320 may instruct the sixth mobile object 10f and the seventh mobile object 10g to make lane changes.

FIG. 24 shows an example of a result realized by the priority control module 320 of the present embodiment causing a mobile object 10 that is not included among mobile objects 10 moving in a group in the same lane to make a lane change. In this way, the priority control module 320 can perform the priority movement control on mobile objects 10 moving in a group. If the fifth mobile object 10e is ahead of the mobile objects 10 moving in the group by a distance that is less than or equal to a reference distance, the priority control module 320 may instruct this fifth mobile object 10e to make a lane change.

The priority control module 320 may be operable to, if some of the two or more mobile objects 10 moving in a group have not completed their lane changes, instruct another mobile object positioned within a predetermined reference range from this group to stay in its lane. In this way, the priority control module 320 can perform the priority movement control safely and reliably on the mobile objects 10 moving in the group.

If there are a plurality of groups that each contain a plurality of mobile objects 10 moving, the system 100 of the present embodiment may perform the priority movement control for each of these groups. The priority assigning module 310 may be operable to, if a plurality of groups including two or more mobile objects 10 are mixed with each other on a route, increase the priority of each mobile object 10 included in one of these group to be higher than the priority of each mobile object 10 included in the other groups.

If n groups are moving on one route, the priority assigning module 310 may assign priorities with values that are 1 to n higher than the priorities of the mobile objects 10 moving independently for each group. For example, if two groups are moving in the route where one group shown in FIG. 22 is moving, the priority assigning module 310 assigns a priority of 4 to each mobile object 10 included in one of the two groups and assigns a priority of 5 to each mobile object 10 included in the other group.

The priority assigning module 310 may assign a priority to each mobile object 10 in the group in which the lead mobile object 10 is positioned farthest ahead that is higher than the priority assigned to each mobile object 10 in the other groups. Instead, the priority assigning module 310 may assign a priority to each mobile object 10 in the group having a higher urgency that is higher than the priority assigned to each mobile object 10 in the other groups. In this way, even if a plurality of groups are moving on a single route, the system 100 can combine processes similar to the processes described in FIGS. 17 and 18 to perform the priority movement control for the plurality of groups.

The system 100 according to the present embodiment is an example in which the system 100 performs priority movement control for a plurality of mobile objects 10 in a route having a plurality of lanes. Instead of or in addition to this, the system 100 may perform the priority movement control for a plurality of mobile objects 10 in a plurality of routes. Specifically, the priority control module 320 may be operable to perform the priority movement control that includes causing a mobile object 10 that cannot be given priority in one route to move to another route.

The priority control module 320 may be operable to perform priority movement control that includes causing a mobile object 10 that has been assigned a high priority in one route to move to another priority route. The priority control module 320 may be operable to determine a priority route on which a mobile object 10 having a higher priority than another mobile object 10 can move with priority, according to information such as past traffic data, a future traffic prediction, events, and traffic states at a plurality of edges included in the one route.

The priority control module 320 may be operable to determine the priority route before a plurality of mobile objects 10 move, at a timing when there is a mobile object 10 within a reference distance of an area predicted to be crowded, a timing when crowding has begun at the edges in the progression direction of the mobile object 10, a timing when the priority of the mobile object 10 is changed, or the like. For example, by determining a priority route in response to an emergency vehicle such as an ambulance beginning to move and setting a higher priority for the emergency vehicle than for other mobile objects 10, the priority control module 320 can enable the emergency vehicle to move with priority while avoiding the crowding.

If there is a distribution in which the number of mobile objects 10 having high priority and the number of mobile objects 10 having low priority are approximately the same, the priority control module 320 may determine a priority route on which the mobile objects 10 having higher priorities are to move. In this way, the system 100 according to the present embodiment can perform the priority movement control while managing the movement of a plurality of mobile objects 10, and can therefore more accurately predict traffic jams or the like and efficiently set priority routes and the like. Furthermore, by using a combination of the priority movement control for a single route and the priority movement control for determining a priority route from among a plurality of routes, the system 100 can control the movement of a plurality of mobile objects 10 in greater detail, and can therefore efficiently reduce the effect of traffic jams even when such traffic jams occur.

The priority assigning module 310 according to the present embodiment described above assigns priorities to the mobile objects 10 based on the mobile objects 10 and information concerning the routes travelled by the mobile objects 10. Instead of or in addition to this, the priority assigning module 310 may assign the priorities according to input from drivers of the mobile objects 10 and/or a user of the system 100. In this case, the priority assigning module 310 may be operable to increase the priority of a mobile object 10 in response to the user of this mobile object 10 paying a fee. The priority assigning module 310 may assign a distance, time period, priority amount, or the like to the mobile object 10 according to the fee.

Figure 25:
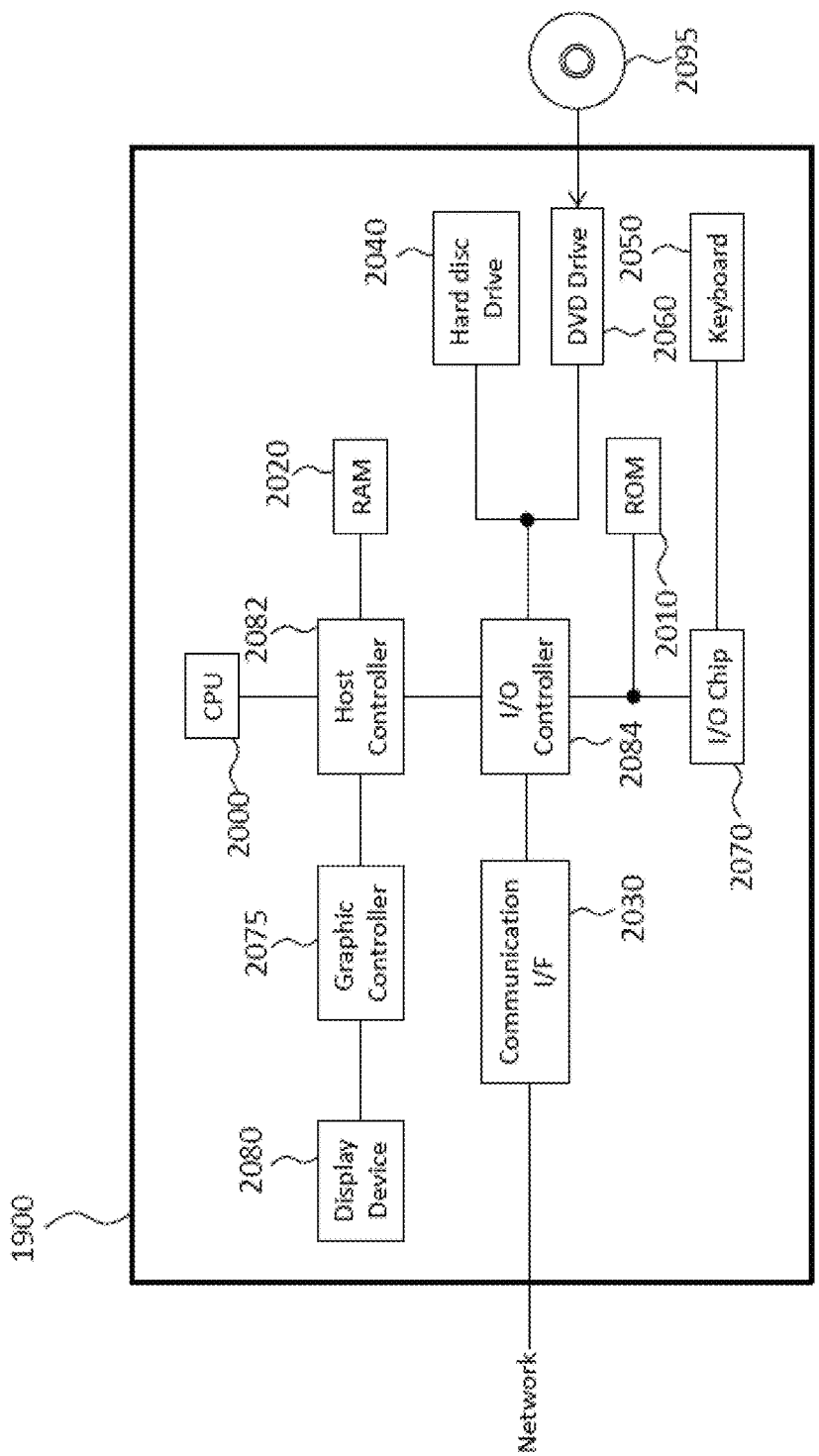
FIG. 25 shows a computer according to an embodiment of the invention.

FIG. 25 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the subsystems 200 and other element (s) in the system 100 of FIG. 3, FIG. 14, and FIG. 15, includes a determining module. The program or module acts on the CPU 2000, to cause the computer 1900 to function as a section, component, element such as determining section 146.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for managing geographic space and mobile objects thereon.

What is claimed is:

1. A system comprising:
a mobile object server configured to manage a movement of a first mobile object and a movement of a second mobile object in a geographic space; and
a priority control module configured to prioritize the movement of the first mobile object over the movement of the second mobile object based on determining that the first mobile object has a higher priority than the second mobile object, wherein prioritizing the movement of the first mobile object over the second mobile object changes a management path of the second mobile object from a first management path to a second management path; and
a priority assigning module that is in communication with the mobile object server and is configured to reassign the priority of the first mobile object and the second mobile object, wherein the priority assigning module is configured to increase the priority of the second mobile object in response to the second mobile object moving ahead of the first mobile object.

2. The system according to claim 1, wherein the priority control module is configured to instruct the second mobile object to make a lane change based on the first mobile object being positioned behind the second mobile object.

3. The system according to claim 2, wherein the priority control module is configured to perform the priority movement control between the first mobile object and the second mobile object, based on a speed of the first mobile object being less than or equal to a predetermined reference speed.

4. The system according to claim 1, wherein
the priority control module configured to perform the priority movement control of the first mobile object based on a time since a previous control movement is less than a threshold time.

5. The system according to claim 4, wherein the threshold time is based on a route used by the first management path.

6. The system according to claim 1, wherein the priority assigning module is configured to reassign priority to the first mobile object and the second mobile object according to at least one of: a number of people riding in each mobile object and a state of the people riding in each mobile object.

7. The system according to claim 1, wherein the priority assigning module is configured to increase the priority of the second mobile object in response to a user of the second mobile object paying a fee.

8. The system according to claim 1, further comprising:
the priority assigning module is configured to determine that the first mobile object and a third mobile object are traveling in a group; and
based on determining that the first mobile object and third mobile object are traveling in a group, increasing the priority of the first mobile object.

9. The system according to claim 8, wherein the priority assigning module is configured to set the priority of the first mobile object and the third mobile object higher than the priority of the second mobile object and a fourth mobile object, wherein the second mobile object and the fourth mobile object are traveling in a group.

10. The system according to claim 1, wherein the priority control module is configured to:
determine that the first mobile object and a third mobile object are traveling in a group
instruct the first mobile object and the third mobile object to make lane changes one at a time; and
instruct the second mobile object to make a lane change based on determining that the second mobile object is not traveling in the group.

11. The system according to claim 9, wherein the priority control module is configured to instruct a fourth mobile object positioned within a predetermined reference range from the group to stay in the lane based on a portion of the two or more mobile objects moving in the group has not completed the lane change.

* * * * *